(12) United States Patent
Gumaste

(10) Patent No.: US 7,499,465 B2
(45) Date of Patent: Mar. 3, 2009

(54) HEURISTIC ASSIGNMENT OF LIGHT-TRAILS IN AN OPTICAL NETWORK

(75) Inventor: Ashwin Anil Gumaste, Dallas, TX (US)

(73) Assignee: Fujitsu Limited, Kawasaki (JP)

( * ) Notice: Subject to any disclaimer, the term of this patent is extended or adjusted under 35 U.S.C. 154(b) by 679 days.

(21) Appl. No.: 11/185,958

(22) Filed: Jul. 19, 2005

(65) Prior Publication Data

US 2007/0019662 A1 Jan. 25, 2007

(51) Int. Cl.
*H04L 12/28* (2006.01)
(52) U.S. Cl. .......................................... 370/431; 398/43
(58) Field of Classification Search ........................ None
See application file for complete search history.

(56) References Cited

U.S. PATENT DOCUMENTS

| | | | |
|---|---|---|---|
| 4,651,316 A | 3/1987 | Kocan et al. ................. | 370/462 |
| 5,258,978 A | 11/1993 | Cloonan et al. .............. | 370/411 |
| 5,469,428 A | 11/1995 | Tokura et al. | |
| 5,724,166 A | 3/1998 | Nakata | |
| 5,854,700 A | 12/1998 | Ota | |
| 5,903,371 A | 5/1999 | Arecco et al. | |
| 6,160,648 A | 12/2000 | Oberg et al. | |
| 6,169,746 B1 | 1/2001 | Ueda et al. ................... | 370/466 |
| 6,195,186 B1 | 2/2001 | Asahi | |
| 6,504,849 B1 | 1/2003 | Wang et al. .................. | 370/455 |
| 6,567,194 B1 | 5/2003 | Badr .............................. | 398/1 |
| 6,594,232 B1 | 7/2003 | Dupont | |
| 6,701,085 B1 | 3/2004 | Muller | |
| 6,728,484 B1 | 4/2004 | Ghani .......................... | 398/42 |
| 6,766,113 B1 | 7/2004 | Al-Salameh et al. | |

(Continued)

FOREIGN PATENT DOCUMENTS

WO WO 03/104849 A2 12/2003

OTHER PUBLICATIONS

Yoo et al, A New Optical Burst Switching Protocol for Supporting Quality of Service, State of New York University at Buffalo, 10 pages, 1998.*

(Continued)

*Primary Examiner*—Frank Duong
(74) *Attorney, Agent, or Firm*—Baker Botts L.L.P.

(57) ABSTRACT

A method for assigning a light-trail in an optical network includes identifying unassigned traffic flows in the network that require assignment to a light-trail, where each traffic flow is communicated from an associated source node to an associated destination node. The method also includes identifying which unassigned traffic flow includes the largest amount of traffic, establishing a new light-trail beginning at the source node of the identified traffic flow and ending at the destination node of the identified traffic flow, and assigning the identified traffic flow to the established light-trail. Furthermore, the method includes determining whether there are any unassigned traffic flows having associated source and destination nodes included in the established light-trail. If such unassigned traffic flows are determined to exist within the light-trail, the method includes assigning the unassigned traffic flows to the light-trail in order of the amount of traffic each traffic flow includes until a capacity of the light-trail is reached. The steps of the method are repeated until no traffic flows in the optical network require assignment to a light-trail.

16 Claims, 7 Drawing Sheets

U.S. PATENT DOCUMENTS

| | | | |
|---|---|---|---|
| 6,775,477 | B2 | 8/2004 | Badr .............................. 398/1 |
| 6,795,394 | B1 | 9/2004 | Swinkels et al. |
| 6,850,711 | B2 | 2/2005 | Tsuruta ...................... 398/168 |
| 6,882,799 | B1 | 4/2005 | Beshai et al. |
| 6,889,007 | B1 | 5/2005 | Wang et al. ................... 398/79 |
| 7,016,363 | B1 | 3/2006 | Reed et al. |
| 7,031,299 | B2 * | 4/2006 | Chaudhuri et al. .......... 370/352 |
| 7,088,920 | B2 | 8/2006 | Krishnaswamy et al. |
| 7,184,663 | B2 | 2/2007 | Kinoshita et al. |
| 7,218,854 | B1 | 5/2007 | Unitt et al. |
| 7,308,198 | B1 | 12/2007 | Chudak et al. |
| 2003/0223104 | A1 | 12/2003 | Kinoshita et al. |
| 2003/0223682 | A1 | 12/2003 | Kinoshita et al. |
| 2004/0052530 | A1 | 3/2004 | Tian et al. |
| 2004/0252995 | A1 | 12/2004 | Ovadia et al. |
| 2005/0013613 | A1 | 1/2005 | Stevenson et al. |
| 2005/0088964 | A1 | 4/2005 | Yang et al. |
| 2005/0191054 | A1 | 9/2005 | Aoki et al. |
| 2006/0013584 | A1 | 1/2006 | Miyazaki |
| 2006/0188258 | A1 | 8/2006 | Gumaste et al. |
| 2006/0210268 | A1 | 9/2006 | Gumaste et al. |
| 2006/0210273 | A1 | 9/2006 | Gumaste et al. |
| 2006/0222360 | A1 | 10/2006 | Gumaste et al. |
| 2006/0228112 | A1 | 10/2006 | Gumaste et al. |
| 2006/0245755 | A1 | 11/2006 | Gumaste et al. |
| 2007/0019662 | A1 | 1/2007 | Gumaste et al. |
| 2007/0047958 | A1 | 3/2007 | Gumaste et al. |
| 2007/0121507 | A1 | 5/2007 | Manzalini et al. |
| 2007/0255640 | A1 | 11/2007 | Gumaste et al. |

OTHER PUBLICATIONS

Dutton et al., "Understanding Optical Communications," IBM International Technical Support Organization, Sep. 1998, p. 9, 366, and 367 (3 pages).

Ramaswami et al., "Optical Networks: A Practical Perspective," First Edition, Morgan Kauffman Publications, 1998, pp. 423-462 (41 total pages).

Banaerjee et al., "Generalized Multiprotocol Label Switching: An Overview of Routing and Management Enhancements," IEEE Communications Magazine, Jan. 2001, pp. 144-149.

Bertsekas, Dimitri, "The Auction Algorithm: A Distributed Relaxation Method for the Assignment Problem," Report LIDS-P-1653, Mar. 1987, Revised Sep. 1987, pp. 1-27.

Chlamtac et al., "Bandwidth Management in Community Networks," Center for Advance Telecommunications Systems and Services, pp. 1-11, 2002, IWDC, LNCS 2571.

Chlamtac et al., Lightpath Communications: An Approach to High Bandwidth Optical WAN's, IEEE Transactions on Communications, vol. 40, No. 7, Jul. 1992, pp. 1171-1182.

Chlamtac et al., "Light-Trails: A Solution to IP Centric Communication in the Optical Domain," 11 pages, Center for Advance Technology Systems and Services, University of Texas at Dallas, Texas 75083, USA, Quality of Service in Multiservice IP Networks, Second International Workshop, QoS-IP 2003, Feb. 2003.

Dolzer et al., "Evaluation of Reservation Mechanisms for Optical Burst Switching," 8 pages, 2001, AEU Int. J. Electron. Commun. 55 No. 1, 1-1.

Fang et al., "Optimal Light Trail Design in WDM Optical Networks," IEEE Communications Society, 2004 IEEE, pp. 1699-1703.

Foster, "The Grid Blue Print for a New Computing Infrastructure," Morgan Kauffman, Nov. 1998, pp. 479-532.

Frederick et al., "Light Trails: A Sub-Wavelength Solution for Optical Networking," 2004 IEEE, 2004 Workshop on High Performance Switching and Routing, Apr. 19-21, 2004.

Fumagalli et al., "The Multi-Token Inter-Arrival Time (MTIT) Access Protocol for Supporting IP over WDM Ring Network," 1999 IEEE, pp. 586-590.

Ghani et al., "On IP-Over-WDM Integration," IEEE Communications Magazine, Mar. 2000, pp. 72-84, WDM Optical Networks: A Reality Check.

Gumaste et al., "A Scheduling Procedure for Control Signaling in Optical Burst Switched Network," in Proceedings for the First International Conference on Optical Communications and Networks, Nov. 11-14, 2002, pp. 190-193.

Gumaste et al., Bifurcated Traffic and Channel Assignment (BITCA) to Interconnected Metro Rings, 3 pages, OFC 2002.

Gumaste et al., "Light-Frames: A Pragmatic Framework for Optical Packet Transport," IEEE Communications Society, pp. 1537-1542, 2004.

Gumaste et al., "Light-Trail and Light-Frame Architectures for Optical Networks," PHD Thesis, University of Texas Dallas, Dec. 2003.

Gumaste et al., " Light-Trails: A Novel Conceptual Framework for Conducting Optical Communications," Center for Advanced Telecommunications Services and Studies, 7 pages, 2003.

Gumaste et al., Light Trails: An Optical Solution for IP Transport, J. Opt. Net., vol. 3, 2004, pp. 261-281, Center for Advanced Telecommunications Systems and Services, The University of Texas at Dallas, May 2004, vol. 3, No. 5, Journal of Optical Networking, pp. 261-281.

Gumaste et al., "Heuristic and Optimal Techniques for Light-Trail Assignment in Optical WDM Networks," Photonics Networking Laboratory, 7 pages, unknown.

Gumaste et al., Mesh Implementation of Light Trails: A Solution to IP Centric Communication, 6 pages, Center for Advanced Telecommunications Services and Studies, unknown.

Gumaste et al., "Next-Generation Optical Storage Area Networks: The Light-Trails Approach," Optical Storage Area Networks, IEEE Communications Magazine, Mar. 2005, pp. 72-79.

Gumaste et al., "Optimizing Light-Trail Assignment to WDM Networks for Dynammic IP Centric Traffic," pp. 113-118, unknown.

Gumaste et al. Performance Evaluation and Demonstration of Light Trails in Shared Wavelength Optical Networks (SWONSs), 2 pages, date unknown.

Gumaste et al., "Providing Bandwidth on Demand to End-Users by Adaptations to a GMPLS Framework: The Light-Trails Approach," National Fiber Optics Engineers Conference, 2003 Technical Proceedings, pp. 1137-1141, 2003.

Gumaste et al., "Optical Implementation of Resilient Packet Rings Using Light-Trails," Advanced Computer Network and Architecture Laboratory, 7 pages, unknown.

Humblet, "Models of Blocking Probability in All-Optical Networks With and Without Wavelength Changers," IEEE Journal on Selected Areas in Communications, Jun. 1996, vol. 14, No. 5, ISACEM, 11 pages.

Kinoshita, S.. "Broadband Fiber Optic Amplifiers," OFC 2001, Optical Fiber Communications Conference and Exhibit, Mar. 17-22, 2001, 5 pages.

Ota et al., "High-Speed, Burst-Mode, Packet-Capable Optical Receiver and Instantaneous Clock Recovery for Optical Bus Operation," Journal of Lightwave Technology, vol. 12, No. 2, Feb. 1994, pp. 325-331.

Qiao et al., "On an IP-Centric Optical Control Plane" Intelligence in Optical Networks, IEEE Communication Magazine, Sep. 2001, pp. 88-93.

Ramaswami et al., "Routing and Wavelengths Assignment in All-Optical Networks," IEEE/ACM Transactions on Networking, Oct. 1995, vol. 5, No. 3, pp. 489-500.

Resilient Packet Ring Alliance, "An Introduction to Resilient Packet Ring Technology," A White Paper by the Resilient Packet Ring Alliance, Oct. 2001, pp. 1-16.

Sahasrabuddhe et al., "Fault Management in IP-Over-WDM Networks: WDM Protection versus IP Restoration," IEEE Journal on Selected Areas in Communications, vol. 20, No. 1, Jan. 2002, pp. 21-33.

Sasaki et al., "The Interface Between IP and WDM and Its Effect on the Cost of Survivability," IEEE Communications Magazine, Jan. 2003, World Telecommunications Congress 2002 (WTC 2002), pp. 74-79.

Shrinkhande et al., "CSMA/CA MAC Protocols for IP HORNET: An IP HORNET: An IP Over WDM Metropolitan Area Ring Network," Stanford University Optical Communications Research Laboratory, 5 pages, 2000.

Spadaro et al., "Positioning of the RPR Standard in Contemporary Operator Environments," 10 pages, unknown.

Tancevski et al., "Optical Routing as Asynchronous, Variable Length Packets," IEEE Journal on Selected Areas in Communications, vol. 18, No. 10, Oct. 2000, pp. 2084-2093.

Verma et al., "Optical Burst Switching: A Viable Solution for Terabit IP Backbone," IEEE Network Magazine, vol. 14, No. 6, Nov./Dec. 2000, pp. 48-53.

Yoo et al., "Just Enough Time (JET): A High Speed Protocol for Bursty Traffic in Optical Networks,:" Proc. IEE/LEOS Tech. G11, Aug. 1997, pp. 26-27.

Yener et al., "Flow Trees: A Lower Bound Computation Tool for Network Optimization," Columbia Tool for Network Optimization, Columbia Univ. Tech. Rep. CUCS-006-94, unknown.

Zhang et al., "Differentiated Multi Layer Survivability in IP/WDM Networks," in Network Operations and Management Symposium, IEEE, New York, 2002, pp. 681-696.

Zhang et al., "A Heuristic Wavelength Assignment Algorithm for Multihop WDM Networks with Wavelength Routing and Wavelength Reuse," in Proc. INFOCOM 94, 1994, pp. 534-543.

Gumaste, "Method and System for Time Sharing Transmission Frequencies in an Optical Network," U.S. Appl. No. 11/061,255, filed Feb. 18, 2005.

Gumaste, "System and Method for Implementing Optical Light-Trails," U.S. Appl. No. 11/080,051, filed Mar. 15, 2005.

Gumaste, "System and Method for Implementing Optical Light-Trails," U.S. Appl. No. 11/080,752, filed Mar. 15, 2005.

Gumaste, "System and Method for Bandwidth Allocation in an Optical Light-Trail," U.S. Appl. No. 11/218,262, filed Aug. 13, 2005.

Gumaste, "System and Method for Transmission and Reception of Traffic in Optical Light-Trails," U.S. Appl. No. 11/095,246, filed Mar. 30, 2005.

Gumaste, "System and Method for Protecting Optical Light-Trails," U.S. Appl. No. 11/098,720, filed Apr. 4, 2005.

Gumaste, "System and Method for Shaping Traffic in Optical Light-Trails," U.S. Appl. No. 11/118,899, filed Apr. 29, 2005.

Gumaste, "System and Method for Bandwidth Allocation in an Optical Light-Trail," U.S. Appl. No. 11/380,812, filed Apr. 28, 2006.

* cited by examiner

HEURISTIC ASSIGNMENT OF LIGHT-TRAILS IN AN OPTICAL NETWORK

TECHNICAL FIELD

The present invention relates generally to optical networks and, more particularly, to heuristic assignment of light-trails in an optical network.

BACKGROUND

Telecommunication systems, cable television systems, and data communication networks use optical networks to rapidly convey large amounts of information between remote points. In an optical network, information is conveyed in the form of optical signals through optical fibers. Optical fibers comprise thin strands of glass capable of transmitting optical signals over long distances with very low loss of signal strength.

Recent years have seen an explosion in the use of telecommunication services. As the demand for telecommunication services continues to grow, optical networks are quickly becoming overburdened by the increasing amount of information communicated over such networks. The addition of new networks or the expansion of existing networks may however be too costly to be practical solutions to this problem. Thus, efficient use of network resources has become an important goal in developing and operating optical networks.

Optical networks often employ wavelength division multiplexing (WDM) or dense wavelength division multiplexing (DWDM) to increase transmission capacity. In WDM and DWDM networks, a number of optical channels are carried in each fiber at disparate wavelengths. Network capacity is based on the number of wavelengths, or channels, in each fiber and the bandwidth, or size of the channels. By using WDM add/drop equipment at network nodes, the entire composite signal can be fully demultiplexed into its constituent channels and switched (added/dropped or passed through). In such networks, traffic from one network node to another network node are often assigned to a particular wavelength on which the traffic is communicated over the network. By assigning different traffic streams to different wavelengths, interference between different traffic streams is prevented. However, in certain situations, this creates inefficiency in the network. For example, if the traffic from a node that is assigned a particular wavelength does not typically use much of the bandwidth (capacity) associated with the wavelength, then inefficiencies are created.

SUMMARY

Various techniques for heuristic assignment of light-trails in an optical network are provided. According to one embodiment, a method for assigning a light-trail in an optical network includes identifying unassigned traffic flows in the network that require assignment to a light-trail, where each traffic flow is communicated from an associated source node to an associated destination node. The method also includes identifying which unassigned traffic flow includes the largest amount of traffic, establishing a new light-trail beginning at the source node of the identified traffic flow and ending at the destination node of the identified traffic flow, and assigning the identified traffic flow to the established light-trail. Furthermore, the method includes determining whether there are any unassigned traffic flows having associated source and destination nodes included in the established light-trail. If such unassigned traffic flows are determined to exist within the light-trail, the method includes assigning the unassigned traffic flows to the light-trail in order of the amount of traffic each traffic flow includes until a capacity of the light-trail is reached. The steps of the method are repeated until no traffic flows in the optical network require assignment to a light-trail.

According to another embodiment, a method for assigning a light-trail in an optical network includes selecting a node in the optical network for which traffic flows originating from the node have not been assigned to a light-trail and identifying the traffic flows originating from the selected node, where each traffic flow being communicated from the selected node to an associated destination node. The method also includes establishing a new light-trail beginning at the selected node and including all destination nodes associated with the identified traffic flows originating from the selected node and assigning the identified traffic flows to the established light-trail until a capacity of the light-trail is reached. If identified traffic flows remain unassigned, another light-trail is established, the identified traffic flows area assigned to this light-trail until a capacity of the light-trail is reached, and this step is repeated until all identified traffic flows originating from the selected node are assigned to a light-trail. All the steps of the method are then repeated for each of the plurality of nodes.

A method for assigning light-trails in an optical network includes establishing a light-trail beginning at a first node in the optical network and ending at a second node such that the path of the light-trail includes all traffic flows that that require assignment to a light-trail. If the total traffic flow of all the traffic flows does not exceed the capacity of the established light-trail, the method assigns all the traffic flows to the established light-trail. If the total traffic flow of all the traffic flows exceeds the capacity of the established light-trail, two or more additional light-trails are created that together include the same path as the previously-established light-trail. The previous step of the method is then repeated for each of the additional light-trails until there are sufficient number of light-trails such that all the traffic flows may be assigned to a light-trail.

Technical advantages of certain embodiments of the present invention may include providing efficient techniques for using transmission resources on optical networks. More specifically, in particular embodiments of the present invention, nodes of an optical network are capable of establishing optical "light-trails" that each allow one or more other nodes to transmit optical traffic over the light-trail. A light-trail may be shared by the nodes included in the light-trail to transmit traffic to other nodes included in the light-trail. The use of such light-trails may result in more efficient communication of information in the optical network since a number of nodes can share the bandwidth provided by a wavelength at which the light-trail is established. In order to use light-trails, it must be determined how many light-trails should be created in a network and where in the network these light-trails should be positioned. Although a linear program may be developed to determine an optimal number of light-trails to create and to optimally assign traffic flows in a network to these light-trails, such a linear program is NP complete or unsolvable in polynomial time. Therefore, embodiments of the present invention provide heuristic algorithms that may be used to establish and assign light-trails in an efficient manner.

It will be understood that the various embodiments of the present invention may include some, all, or none of the enumerated technical advantages. In addition other technical advantages of the present invention may be readily apparent to one skilled in the art from the figures, description, and claims included herein.

DETAILED DESCRIPTION OF THE DRAWINGS

Figure 1:
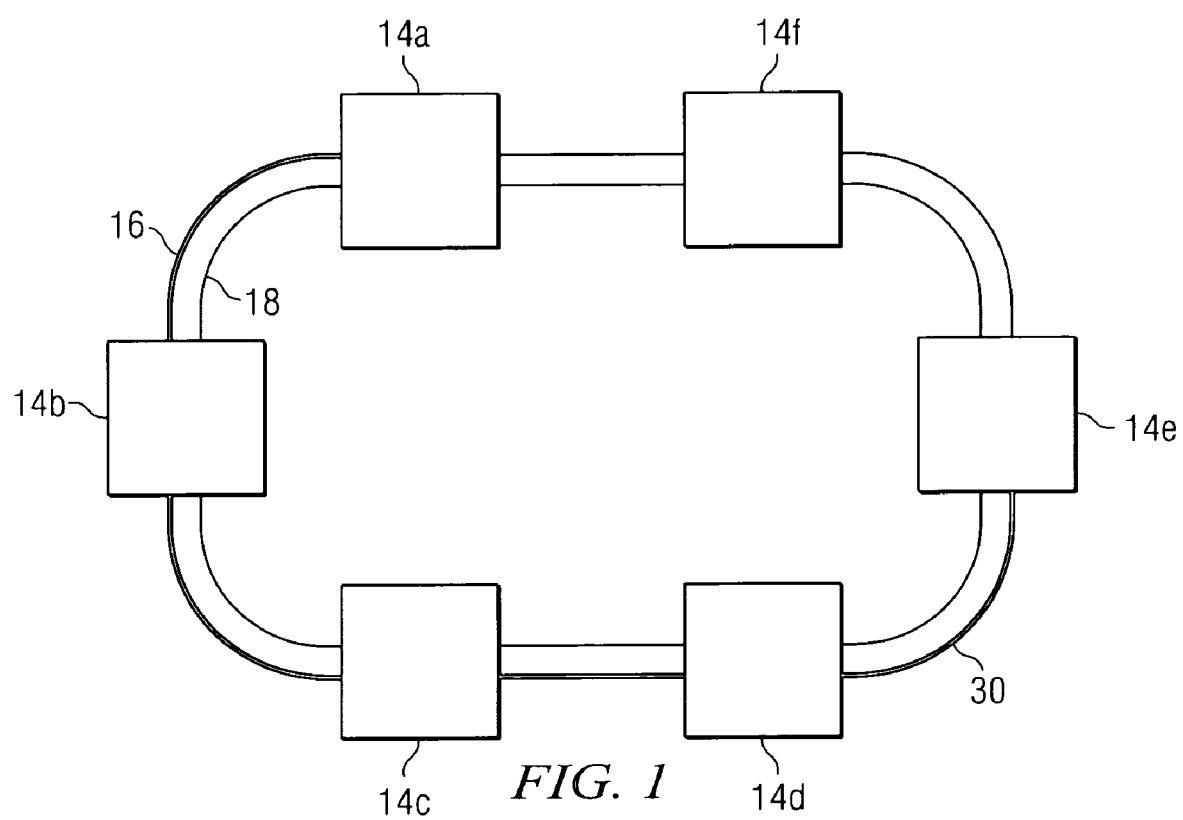
FIG. 1 is a block diagram illustrating an optical ring network in which light-trails may be implemented in accordance with one embodiment of the present invention.

FIG. 1 illustrates an optical network 10 in accordance with one embodiment of the present invention. Optical network 10 includes a plurality of nodes 14 coupled to an optical ring 20. During operation, nodes 14 transmit and receive traffic on optical ring 20 on one of a plurality of wavelengths. In particular, a light-trail, such as light-trail 30 in FIG. 1, may be established over which nodes 14 may transmit optical traffic to other nodes 14 located on that light-trail. Nodes included in a light-trail share the light-trail, as appropriate, to transmit information to other nodes included in the light-trail on a wavelength associated with the light-trail. Thus, a light-trail is a generalization of a light path (an optical wavelength circuit) such that multiple nodes along the path can take part in communication along the path. Therefore, the use of these light-trails addresses the inefficiency discussed above associated with assigning a wavelength for traffic communicated from a single node to another node. In addition, light-trail communications allow optical multicasting and dynamic provisioning.

Figure 2:
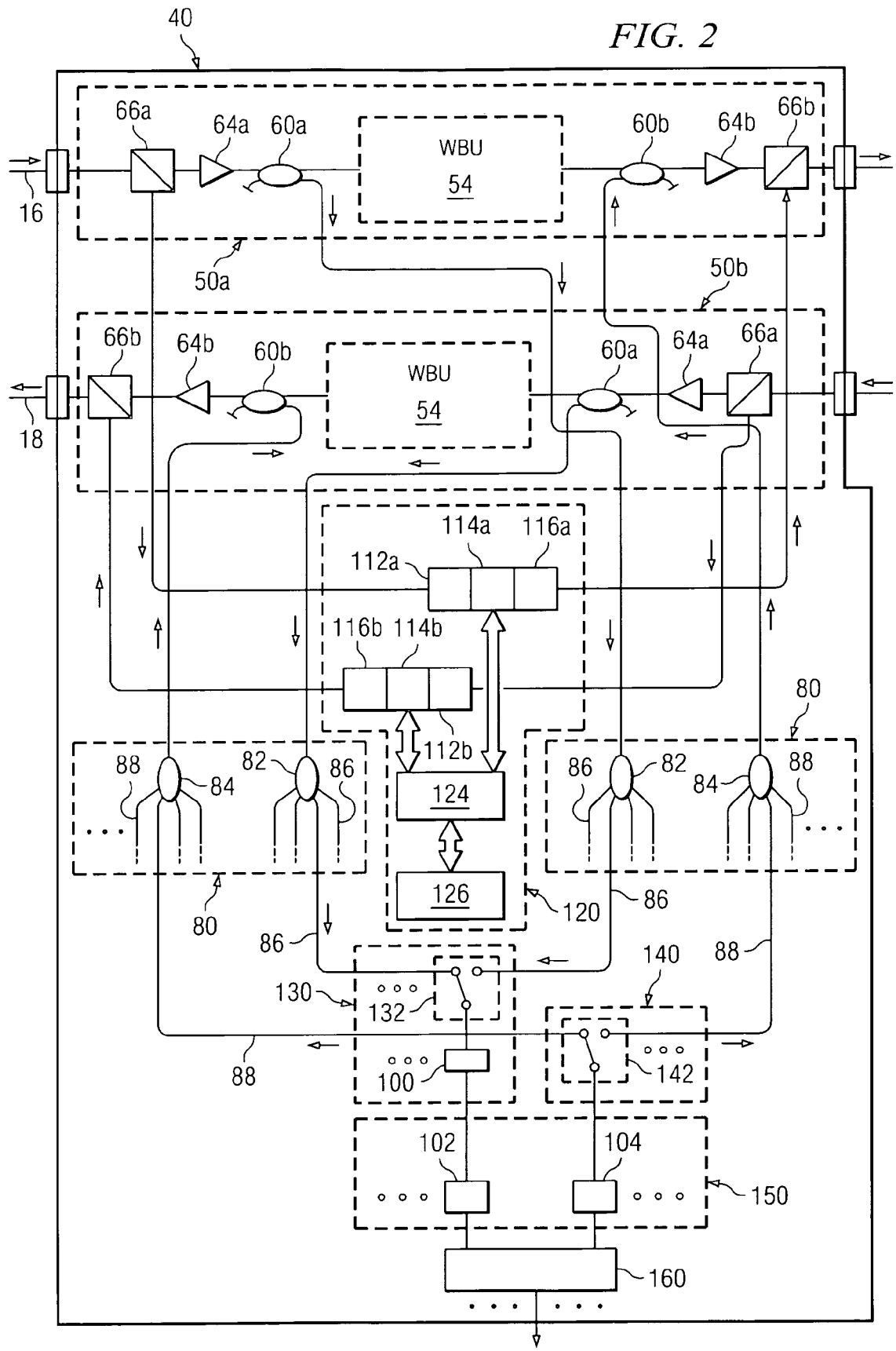
FIG. 2 is a block diagram illustrating a particular embodiment of a node that may be utilized in an optical network implementing light-trails.

Nodes 14 that allow light-trail communication have specific characteristics that enable the nodes 14 to implement light-trails. For example, these characteristics include a drop and continue function (where traffic received by an element of the node is both dropped and forwarded, so as to allow the traffic to continue along the light-trail), passive adding of traffic by the node ("passive" in this context means the adding of traffic without using optical switches that use power, electricity, and/or moving parts), and the use of an out-of-band control channel (as opposed to control signals that are in-band with the data being communicated on the network 10). As described below, FIG. 2 illustrates a particular embodiment of a node 14 including these characteristics.

Referring again to FIG. 1, although a single light-trail 30 is illustrated, nodes 14 may establish light-trails on one or more wavelengths utilized by optical network 10 and multiple non-overlapping light-trails may exist at a particular time on a particular wavelength. To prevent optical interference caused by multiple nodes 14 transmitting simultaneously on a particular light-trail in optical network 10, nodes 14 may utilize particular techniques for sharing the light-trail, as described below. Therefore, there are two levels of "arbitration" associated with light-trails. The first level is the establishment and termination of light-trails to meet particular demands, as well as the "dimensioning" of light-trails (growing or shrinking the trails to meet particular demands). All of these activities may be referred to as the "assignment" of light-trails. Various example techniques for assigning light-trails are described below with reference to FIGS. 4 through 7B. The second level of arbitration is the allocation of the use of the light-trail to nodes in the light-trail. Nodes may be allocated bandwidth according to defined rules or heuristics, predefined bandwidth allocation algorithms, "round robin" techniques, on a dynamic basis, and/or using any other suitable techniques.

Although FIG. 1 illustrates a particular embodiment and configuration of ring network 10, mesh, linear, or other suitable types of optical networks may be used in accordance with the present invention. In the illustrated embodiment, network 10 is an optical network in which a number of optical channels are carried over a common transmission media at different wavelengths. For example, network 10 may be a wavelength division multiplexed (WDM) network, a dense wavelength division multiplexed (DWDM) network, or any other suitable multi-channel network. Network 10 may represent all or a portion of a short-haul metropolitan network, a long-haul intercity network, or any other suitable network or combination of networks. Network 10 may include, as appropriate, a single uni-directional fiber, a single bi-directional fiber, or a plurality of uni- or bi-directional fibers.

Optical ring 20, in the illustrated embodiment, comprises a pair of uni-directional fibers, first fiber 16 and second fiber 18, transporting traffic in a counterclockwise and clockwise direction, respectively. Optical ring 20 optically couples the plurality of nodes 14a-14f, and optical traffic propagates between nodes 14 over optical ring 20. As used herein, "traffic" means information transmitted, stored, or sorted in the network. Such traffic may comprise optical signals having at least one characteristic modulated to encode audio, video, textual, real-time, non-real-time and/or other suitable data. Modulation may be based on phase shift keying (PSK), intensity modulation (IM), and other suitable methodologies. Additionally, the information carried by this traffic may be structured in any suitable manner. Although the description below focuses on an embodiment of network 10 that communicates traffic on optical ring 20 in the form of optical frames, network 10 may be configured to communicate traffic structured in the form of frames, as packets, or in any other appropriate manner.

Using established light-trails, nodes 14 facilitate communication between a plurality of client devices (not shown) coupled to each node 14 through a plurality of client ports. As described in greater detail below, each node 14 may receive traffic from client devices coupled to that node 14 and add this traffic to optical ring 20 to the optical traffic propagating on optical ring 20. Each node 14 may also receive traffic from optical ring 20 and drop traffic destined for client devices of that node 14, such as personal computers (PCs), telephones, fax machines, hard drives, web servers, and/or any other appropriate communication device. Although FIG. 1, illustrates one embodiment of network 10 that includes a particular number of nodes 14, network 10 may include any appropriate number of nodes 14 configured in any appropriate manner.

In operation, nodes 14 generate optical traffic at one or more wavelengths based on electrical signals received by nodes 14 from client devices coupled to nodes 14 and add this optical traffic to optical traffic propagating on optical ring 20. Nodes 14 also receive and drop traffic propagating on optical ring 20 that is destined for one or more of its clients. For the purposes of this description, nodes 14 may "drop" traffic by transmitting a copy of the traffic to any appropriate components that are a part of or coupled to the relevant node 14. As a result, nodes 14 may drop traffic from optical ring 20 by transmitting the traffic to these components while allowing the traffic to continue to downstream components on optical ring 20. Each node 14 drops and electrically converts traffic received on particular wavelengths at which that node 14 is configured to receive traffic and either does not drop or discards traffic transmitted at other wavelengths. Once traffic is dropped from the optical ring 20, nodes 14 may provide optical-to-electrical conversion of the dropped traffic. Nodes 14 then extract, based on addressing information in the traffic, portions of this traffic destined for client devices coupled to that node 14. In certain embodiments, each node 14 includes, or has associated with it, a switching element which may forward the traffic, or a portion thereof, to one or more of a plurality of client devices based on addressing information.

Since nodes 14 time-share a wavelength associated with a particular light-trail, the data flow patterns through a light-trail dominant network may be somewhat "bursty" in nature due to the interleaving of data streams from multiple nodes 14. However, client devices (typically, Layer-2 devices) associated with a node 14 expect that the optical layer will provide uninterrupted communication to the devices. Therefore, to facilitate an interface between the bursty optical layer (due to time sharing of the bandwidth of light-trails) and the continuous client layer, nodes 14 include a device called a burstponder. A burstponder is a device that allows a node 14 to time share a wavelength while creating an impression to client device of the node 14 that the wavelength is available on a seamless and continuous basis. Such a burstponder is described in further detail in conjunction with FIG. 2.

Figure 3A:
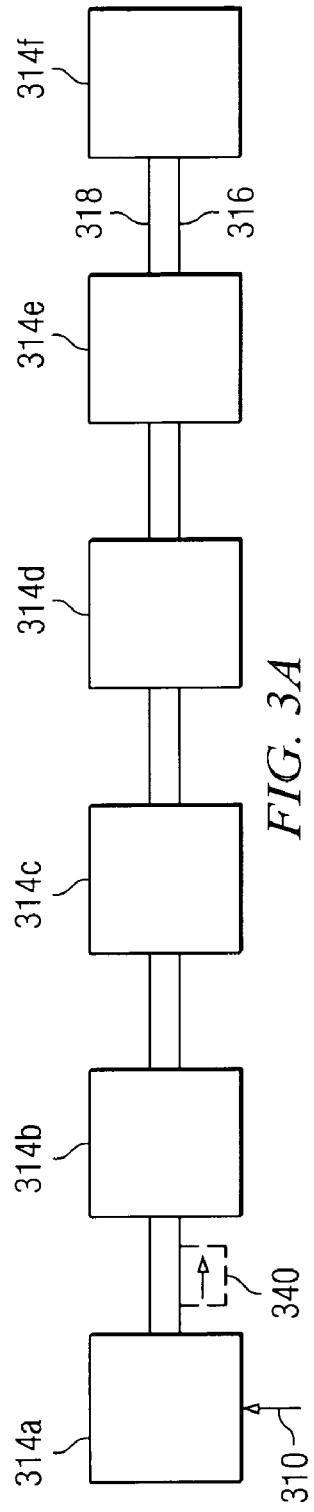
FIG. 3A-3C illustrate example operation of nodes of an optical network in establishing a light-trail.
Figure 3B:
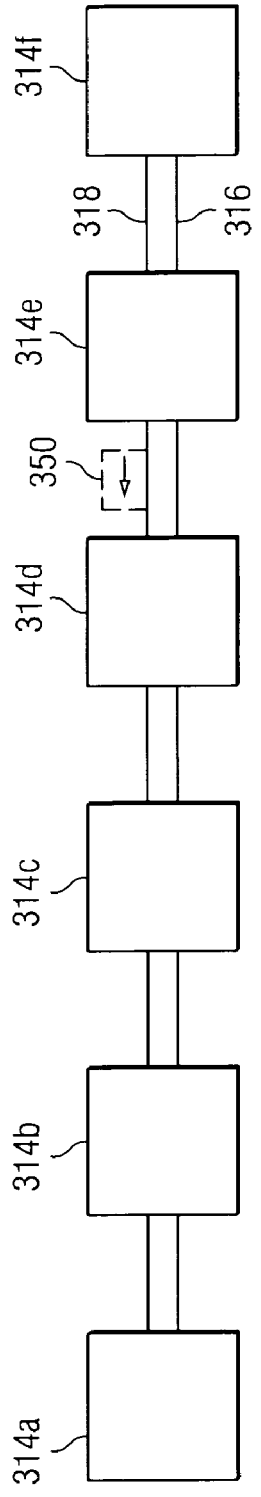
Figure 3C:
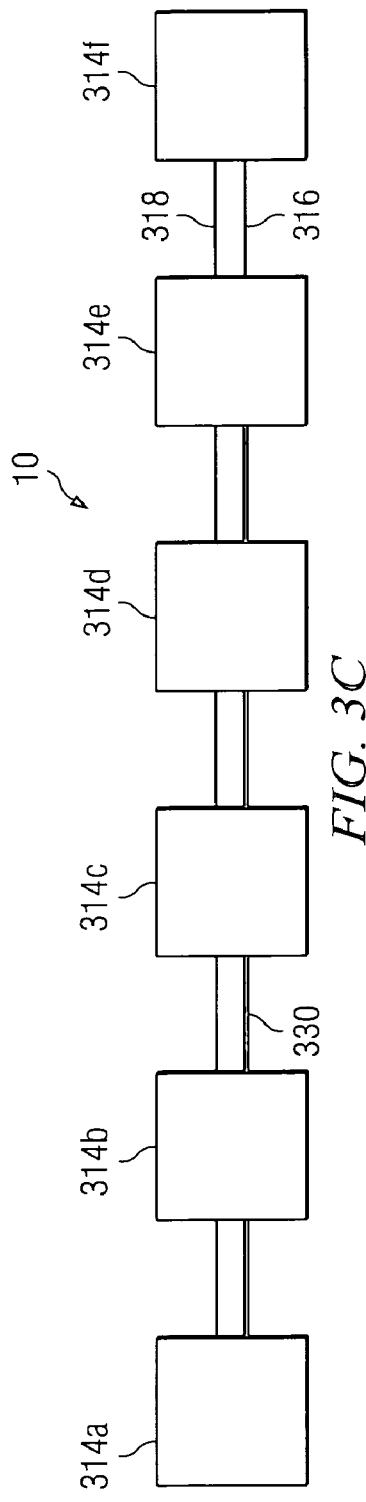

Additionally, nodes 14 may be configured to establish light-trail 30 and transmit or receive some or all optical traffic on light-trail 30. Light-trail 30 represents an optical path on a portion of fiber connecting any two or more components in optical network 10. Light-trail 30 is illustrated in FIG. 1 as a shaded portion of fiber 16. Once light-trail 30 is established, any of the nodes 14 connected to light-trail 30 may transmit optical traffic on light-trail 30 to nodes 14 located downstream from the transmitting node 14 in the direction traffic is propagating along light-trail 30. A particular node 14 may terminate or reconfigure light-trail 30 at any appropriate time. Additionally, as noted above, in particular embodiments, multiple light-trails may be established in optical ring 20, with each light-trail associated with a particular wavelength. Furthermore, multiple, non-overlapping light-trails may be associated with a common wavelength. The operation of a particular embodiment of optical network 10 in establishing a light-trail is illustrated in FIGS. 3A-3C. Furthermore, particular algorithms for determining where light-trails are established and assigned are described in conjunction with FIGS. 4 through 7B.

As mentioned above, to coordinate the establishment and sharing of light-trails, optical network 10 supports an optical supervisory channel (OSC) or other out-of-band control channel on which control signals are exchanged between nodes 14 and/or other components of optical network 10. Nodes 14 may exchange control messages on the OSC to initiate and terminate light-trails and to manage use of established light-trails. In a particular embodiment, the OSC represents one or more wavelengths, among a plurality of wavelengths utilized by optical network 10, that are dedicated to control signals. Alternatively, the OSC may represent a separate fiber in optical ring 20 on which nodes 14 may exchange control signals. According to particular embodiments, control signals associated with a particular light-trail may be transmitted on the OSC in the direction of traffic on that light-trail, in a direction opposite to the direction of traffic on that light-trail, or in both directions on the OSC.

Use of light-trails may result in more efficient transmission of traffic between nodes 14. In particular embodiments, nodes 14 may be configured to use light-trails to transmit all traffic and may establish additional light-trails if the amount of traffic flowing on a particular light-trail exceeds a particular threshold, or if a particular node 14 is unable to transmit traffic (due to use of the light-trail by other nodes 14) that cannot be delayed. In general, however, nodes 14 may be configured to establish light-trails based on any appropriate criteria, factors, or considerations.

FIG. 2 is a block diagram illustrating a particular embodiment of a node 14 for use in implementing light-trails. As shown, node 14 includes transport elements 50a and 50b, distributing/combining elements 80a and 80b, a managing element 120, a drop element 130, an add element 140, a burstponder 150, and a switching element 160. Transport elements 50 add traffic to and drop traffic from fibers 16 and 18. More specifically, transport elements 50 may generate one or more copies of optical signals propagating on fibers 16 and 18 for communication of particular portions of the traffic carried in these optical signals to devices coupled to node 14. Additionally, transport elements 50 may include components appropriate to add traffic generated by node 14 or received from client devices of node 14 to fibers 16 and 18. For example, in the illustrated embodiment, each transport element 50 includes a coupler 60a which splits traffic received by transport elements 50 into two copies and forwards one copy of the traffic to drop element 130, while forwarding the other copy along the relevant fiber. Furthermore, each transport element 50 includes a coupler 60b which adds traffic received from add element 140 to traffic already propagating on the associated fiber. Although two couplers 60a and 60b are illustrated in each transport element 50, particular embodiments may include a single coupler that both adds and drops traffic. Such a single coupler may be used, as an example, in particular embodiments which do not include a wavelength blocking unit 54 (as is described below).

Each transport element 50 also includes, in the illustrated embodiment, a wavelength blocking unit (WBU) 54 configured to terminate particular wavelengths of traffic propagating on fibers 16 and 18. As a result, traffic that has already been received by its intended destination or destinations may be terminated at a subsequent node 14. Furthermore, WBU 54 may be used to isolate a light-trail, as described below. Although shown as a functional block in FIG. 2, WBU 54 may represent and/or include suitable components configured in any appropriate manner to provide the functionality of dynamically blocking certain wavelengths and passing other wavelengths. As one example, WBU 54 may represent a wavelength-selective switch (WSS) operable to output any particular wavelength, or set of wavelengths, received at the input of WBU 54 on the output of WBU 54.

As another example, WBU 54 may represent a structure that includes an optical demultiplexer and an optical multiplexer connected by a series of switches. In such an embodiment, the demultiplexer may demultiplex the signal into its constituent channels. The switches may then be dynamically configured to selectively terminate or forward each channel to the multiplexer based on control signals received by each switch. The channels that are forwarded by the switches are received by the multiplexer, multiplexed into a WDM optical signal, and forwarded to downstream elements.

As another example, WBU 54 may represent a collection of tunable filters tuned to allow only traffic on appropriate wavelengths to be forwarded on fibers 16 or 18. In such an embodiment, a coupler of WBU 54 may receive optical signals input to WBU 54 and split the optical signals into a plurality of copies, transmitting each of these copies to a particular tunable filter. Each tunable filter may then selectively pass traffic propagating at a particular wavelength or within a particular range of wavelengths and block traffic propagating at all other wavelengths. Each tunable filter then forwards the passed traffic propagating at the associated wavelength or wavelengths to an output coupler of WBU 54. The output coupler then combines the output of the various tunable filters to produce an output WDM optical signal and forwards the output optical signal to components downstream from WBU 54.

Transport elements 50 may also include appropriate components to allow node 14 to transmit and receive information pertaining to the status and operation of fibers 16 and 18, other nodes, any light-trails established in network 10, or any other appropriate elements or functionality of optical network 10. In particular, each node 14 may include elements to allow node 14 to receive and transmit messages on an optical supervisory channel (OSC). In the illustrated embodiment, each transport element 50 includes an OSC ingress filter 66a that processes an ingress optical signal from its respective fiber 16 or 18. Each OSC filter 66a filters the OSC signal from the optical signal and forwards the OSC signal to a respective OSC receiver 112. Each OSC filter 66a also forwards the remaining optical signal to other components of transport element 50. Each transport element 50 also includes an OSC egress filter 66b that adds an OSC signal from an associated OSC transmitter 116 to the optical signal propagating on the associated fiber 16 or 18 and forwards the combined signal to elements located downstream on fiber 16 or 18. The added OSC signal may be locally-generated data or may be OSC data received by node 14 and passed through managing element 120.

Distributing/combining elements 80 may each comprise a drop signal splitter 82 and an add signal combiner 84. Splitters 82 may each comprise a coupler connected to one optical fiber ingress lead and a plurality of optical fiber egress leads which serve as drop leads 86. Each drop lead 86 may be connected to a drop element 130 associated with a particular local port of node 14. Although the illustrated embodiment shows a splitter 82 coupled to one drop lead 86, splitter 82 may be coupled to any appropriate number of drop leads 86.

Splitter 82 may, in general, represent any appropriate component or collection of components capable of splitting the optical signal received by splitter 82 into a plurality of copies each to be propagated on a particular drop lead 86. In particular embodiments in which four drop leads 86 are implemented, splitters 82 may each specifically comprise a 2×4 optical coupler, where one ingress lead is terminated, the other ingress lead is coupled to a coupler 60 via a fiber segment, and the four egress leads are used as drop leads 86.

Combiners 84 similarly may each comprise a coupler with multiple optical fiber ingress leads, which serve as add leads 88, and one optical fiber egress lead. Each add lead 88 may be connected to an add element 140 associated with a particular port of node 14. In particular embodiments in which combiner 84 is coupled to four ingress leads, combiner 84 may comprise a 2×4 optical coupler, where one egress lead is terminated, the other egress lead is coupled to a coupler via a fiber segment, and the four ingress leads comprise add leads 88. As with splitter 82, the described components of combiner 84 may be replaced by any suitable component or collection of components for combining a plurality of optical signal into a single output signal. Although the illustrated embodiment shows a combiner 84 coupled to one add lead 88, combiner 84 may be coupled to any appropriate number of add leads 88.

Drop elements 130 selectively couple ports of burstponder 150 to outputs of distributing/combining elements 80 through filters 100, which are each capable of isolating traffic in a different wavelength from each copy of the optical signal created by splitter 82. As a result, drop elements 130 may output particular wavelengths of traffic from fibers 16 and 18 to particular ports of burstponder 150. Add elements 140 also couple particular ports of burstponder 150 to combining/distributing elements 80. Drop element 130 and add element 140 may include, respectively, a drop switch 132 and an add switch 142, or other suitable components, to selectively connect associated ports of burstponder 150 to fiber 16 or 18. Alternatively, add switch 142 may be replaced by a coupler which can split a signal from the associated transmitter 104 and by a pair of shutters (one for each branch of the split signal) that can control whether the signal is added to fiber 16, fiber 18, or both fibers 16 and 18. As a result, drop element 130 and add element 140 may be utilized to support protection switching for node 14. Alternatively, particular embodiments of drop element 130 and add element 140 may omit drop switch 132 and add switch 142, respectively, and couple different ports of burstponder 150 to each fiber 16 and 18. Moreover, in particular embodiments, node 14 may include multiple drop elements 130 and/or add elements 140, each associated with a particular wavelength supported by optical network 10.

Burstponder 150 converts bursty or time-interleaved optical traffic received from drop elements 130 to seamless and continuous data traffic for delivery to client devices of node 14 and converts data traffic received from client devices to optical traffic for transmission on fiber 16 or 18 in bursts when the node 14 has use of the light-trail. As described above, burstponder 150 allows node 14 to time share a light-trail while creating an impression to client devices of the node 14 that the wavelength is available on a seamless and continuous basis. Burstponder 150 may include any appropriate number of receivers 102 operable to receive optical signals and generate electrical signals based on these optical signals and transmitters 104 operable to receive electrical signals and to transmit optical signals based on these electrical signals. Depending on the configuration of node 14, each of these receivers 102 and transmitters 104 may be fixed or tunable. Each of these receivers 102 and transmitters 104 may be a burst-mode receiver or transmitter. Such burst-mode receivers may have burst mode clock and data recovery operation. As described below, switching element 160 may represent any appropriate component or components for transmitting data traffic output by burstponder 150 to appropriate client devices of node 14 and for transmitting data traffic received from client devices of node 14 to burstponder 150. Although shown as part of node 14 in FIG. 2, switching element 160 may be physically separate from node 14.

Managing element 120 may comprise OSC receivers 112, OSC interfaces 114, OSC transmitters 116, and an element management system (EMS) 124. Each OSC receiver 112, OSC interface 114, and OSC transmitter 116 set forms an OSC unit for one of the fibers 16 or 18 in the node 14. The OSC units receive and transmit OSC signals for the EMS 124. EMS 124 may be communicably coupled to a network management system (NMS) 126. NMS 126 may reside within node 14, in a different node, or external to all nodes 14.

EMS 124 and/or NMS 126 may comprise logic encoded in media for performing network and/or node monitoring, failure detection, protection switching and loop back or localized testing functionality of the optical network 10. In a particular embodiment, EMS 124 and/or NMS 126 generate, transmit, receive, and/or process control messages associated with the establishment, operation, and termination of light-trails. Any logic included in EMS 124 or NMS 126 may comprise software encoded in a disk or other computer-readable medium, such as memory, and/or instructions encoded in an application-specific integrated circuit (ASIC), field programmable gate array (FPGA), or other processor or hardware. It will be understood that functionality of EMS 124 and/or NMS 126 may be performed by other components of the network and/or be otherwise distributed or centralized. For example, operation of NMS 126 may be distributed to the EMS 124 of nodes 14, and the NMS 126 may thus be omitted as a separate, discrete element. Similarly, the OSC units may communicate directly with NMS 126 and EMS 124 omitted.

EMS 124 monitors and/or controls elements within node 14. For example, EMS 124 may control operation of transmitters 104, receivers 102, and WBU 54 to facilitate the establishment and use of light-trails. In the illustrated embodiment, EMS 124 receives an OSC signal from each of fiber 16 and 18 in an electrical format via an OSC receiver 112 associated with that fiber (the OSC receiver 112 obtains the signal via an OSC filter 66*a*). This OSC signal may include one or more of multiple types of control messages, as described above. EMS 124 may process the signal, forward the signal and/or loop-back the signal. EMS 124 may be operable to receive the electrical signal and resend the OSC signal via OSC transmitter 116 and OSC filter 66*b* to the next node on fiber 16 or 18, adding, if appropriate, locally-generated control messages or other suitable information to the OSC.

NMS 126 collects information from all nodes 14 in optical network 10 and is operable to process control messages transmitted by nodes 14 to manage particular aspects of the use of light-trails. For example, in a particular embodiment, NMS 126 may be operable to select a particular node 14 for transmission on a light-trail when multiple nodes 14 request use of the light-trail. As noted above, NMS 126 may represent a portion or all of EMSs 124 of all nodes 14 in optical network 10. Moreover, although the description below describes particular embodiments of optical network 10 in which functionality is divided between NMS 126 and EMSs 124 in a particular manner, in alternative embodiments the described functionality may be distributed between NMS 126 and EMSs 124 in any appropriate manner. Additionally, although NMS 126 and EMS 124, as shown in FIG. 2, represent, at least in part, components located within node 14, some or all of NMS 126 and/or EMS 124 may be located external to nodes 14.

Although not shown in FIG. 2, node 14 may also include a memory operable to store code associated with EMS 124, NMS 126, and/or other components of optical network 10, information specifying a wavelength assignment scheme utilized for protection traffic on optical network 10, and/or any other suitable information used during operation of optical network 10. Memory may represent one or more memory devices that are located within node 14 or that are physically separate from node 14. Additionally, memory may be shared with other components of optical network 10 including other nodes 14. Memory may represent computer disks, a hard disk memory, random access memory (RAM), read-only memory (ROM), or any other suitable storage media.

In operation, transport elements 50 receive traffic from fibers 16 and 18. In the illustrated embodiment, traffic received from fibers 16 and 18 includes an OSC signal, and transport elements 50 are operable to add and drop the OSC signal to and from fibers 16 and 18. More specifically, each OSC ingress filter 66*a* processes an ingress optical signal from its respective fiber 16 or 18. OSC ingress filter 66*a* filters the OSC signal from the optical signal and forwards the OSC signal to its respective OSC receiver 112. Each OSC ingress filter 66*a* also forwards the remaining transport optical signal to the associated amplifier 64. Amplifier 64 amplifies the signal and forwards the signal to its associated coupler 60*a*. In particular embodiments, amplifier 64 may be omitted, depending on the circumstances.

EMS 124 may process control messages transmitted by other nodes 14 or other components of optical network 10 and adjust operation of node 14 in response. In particular, EMS 124 may reconfigure WBU 54, transmitters 104, filters 100, receivers 102, and/or any other appropriate element of node 14 in response to control messages received by EMS 124. As one example, EMS 124 may, in response to receiving a setup message, configure a WBU 54 of node 14 to allow traffic propagating at a particular wavelength to pass through WBU 54. As another example, EMS 124 may, in response to receiving an intimation message from another node 14, tune a particular filter 100 and/or a particular receiver 102 to allow node 14 to receive optical traffic on a particular wavelength associated with a light-trail.

Furthermore, EMS 124 may also generate control messages for transmission to other nodes 14 or other components of optical network 10. For example, EMS 124 may generate electronic signals associated with setup messages, intimation messages, request messages, and/or any other appropriate type of control messages and communicate these electronic signals to OSC transmitter 116 to transmit optical signals representing the appropriate control message to the associated transport element 50. These control messages may then be added to the optical traffic on fiber 16 or 18, as appropriate.

Meanwhile, coupler 60*a* splits the signal from the amplifier 64 into two copies: a through signal that is forwarded to WBU 54 and a drop signal that is forwarded to distributing/combining element 80. Distributing/combining element 80 may then split the drop signal into one or more copies and forward the copies of the drop signal to one or more drop elements 130. In a particular embodiment, each drop element 130 includes a drop switch 132 that allows drop element 130 to selectively couple a drop signal from either fiber 16 or fiber 18 to a filter 100 included in that drop element 130. Additionally, filter 100 may be tuned to a particular wavelength. As a result, in such an embodiment, traffic propagating at a particular wavelength on the selected fiber is output to burstponder 150.

Burstponder 150 receives the output of a plurality of drop elements 130. A receiver 102 in burstponder 150 that is associated with each drop element 130 converts the optical signal received from that drop element 130 into data traffic. The data traffic generated by each receiver 102 is then output to switching element 160. In particular embodiments of node 14, burstponder 150 may include buffers (not shown) and the output of receivers 102 may be stored in one or more buffers to be transmitted to switching element 160 at an appropriate time.

Switching element 160 receives seamless and continuous data traffic output by burstponder 150 and switches this data traffic in any appropriate manner to facilitate transmission of this data traffic to an appropriate client device of node 14. The data traffic received by switching element 160 from burstponder 150 may include information in the form of packets, frames, and/or datagrams, and/or information structured in any other appropriate form. For example, in a particular embodiment, switching element 160 may represent an L2 switch and may receive electrical signals from burstponder 150 in the form of packets.

Switching element 160 also receives data traffic from client devices coupled to switching element 160 and switches this data traffic to communicate the data traffic to an appropriate port of burstponder 150. The data traffic received by switching element 160 from the client devices may include information in the form of packets, frames, and/or datagrams, and/or information structured in any other appropriate form. As noted above, switching element 160 may represent an L2 switch and may receive data traffic from the client devices in the form of packets. In such an embodiment, the L2 switch may switch each packet, based on a header included in that packet, to deliver the packet to a port of the L2 switch coupled to an appropriate port of burstponder 150.

Burstponder 150 receives data traffic from switching element 160 on one or more ports of burstponder 150. Certain ports of burstponder 150 are configured to receive data traffic from switching element 160, and each of these ports may pass the received data traffic to a particular transmitter 104 in burstponder 150 associated with that port. Each transmitter 104 may then generate a burst of optical traffic from the data traffic received from switching element 160 and transmit that optical traffic to a particular add element 140 associated with that transmitter 104. In particular embodiments, EMS 124 may tune transmitters 104 of burstponder 150, and transmitters 104 may generate optical traffic at a particular wavelength determined by EMS 124. In other embodiments, transmitters 104 transmit at a fixed wavelength. Additionally, burstponder 150 may include one or more buffers that store data traffic from switching element 160 to be input to transmitter 104 at an appropriate time (such as when the node is granted use of a light-trail). Such buffering is useful since a node 14 may not be able to transmit traffic when it is received because another node 14 is using a shared light-trail.

Optical traffic output by transmitters 104 of burstponder 150 is then received by an appropriate add element 140 associated with the transmitter 104 that generated the optical traffic. Each add element 140 may include an add switch 142 capable of selectively coupling that add element to a combiner 84 in a distributing/combining element 80 associated with either fiber 16 or 18. As a result, optical traffic generated by transmitters 104 of burstponder 150 may be added to an appropriate fiber 16 or 18 based on the circumstances. For example, particular embodiments of node 14 may support protection switching and add switch 142 may be reconfigured in response to the detection of a fault on one fiber to transmit optical traffic on the other fiber. The appropriate distributing/combining element 80 then forwards the optical traffic received from burstponder 150 to the coupler 60b of the associated fiber.

Returning to the operation of couplers 60a, in addition to forwarding the drop signal as described above, each coupler 60a forwards the through signal to its respective WBU 54. WBUs 54 receive the optical signal and selectively terminate or forward channels of the through signal. In a particular embodiment of node 14, EMS 124 may control operation of WBU 54 to establish a light-trail on a specified wavelength on a particular fiber 16 or 18 in response to a setup message received from a convener node 14a. In particular, if node 14 represents a node on the interior of the requested light-trail, EMS 124 may configure WBU 54 to allow optical signals propagating at the specified wavelength on the relevant fiber to pass through WBU 54. If node 14 represents a node 14 at the beginning or end of a light-trail, EMS 124 may configure WBU 54 to block optical signals propagating at the specified wavelength on the relevant fiber. In this way, traffic transmitted by a node in a light-trail does not leave the light-trail. Because of this, multiple non-overlapping light-trails may be formed using the same wavelength in the same fiber.

In particular embodiments, however, WBUs 54 may be omitted from the node. In such embodiments, the node will be unable to block the transmission of traffic through the node (since there would be nothing to terminate any of the wavelengths of the copy of the optical signal forwarded from couplers 60a). Therefore, in such embodiments, multiple light-trails may not be formed in the same wavelength. However, in many network topologies, such as ring networks, at least one such node (or some other device in the network) must be able to stop the propagation of optical signals added from the nodes around the network to prevent interference. As an example, otherwise traffic being added in a particular wavelength at a node will propagate around the network and return to the adding node, where it will interfere with new traffic being added in that wavelength. Therefore, particular embodiments may include one or more nodes that include a WBU (such as nodes 14) and one or more other nodes that do not include a WBU. If multiple nodes that include a WBU are used in such embodiments, it may be possible to create multiple light-trails in a single wavelength; however, the locations of these light-trails would be limited according to the number and placement of the nodes including the WBUs.

Returning to the operation of the illustrated node 14, each coupler 60b may subsequently combine the output of the associated WBU 54 with the traffic received from an associated combiner 84. After coupler 60b adds locally-derived traffic to the output of WBU 54, coupler 60b forwards the combined signal to the associated amplifier 64 and OSC egress filter 66b. Each OSC egress filter 66b adds an OSC signal from the associated OSC transmitter 116 to the combined optical signal and forwards the new combined signal as an egress transport signal to the associated fiber 16 or 18 of optical network 10.

FIGS. 3A-3C illustrate example operation of nodes of an optical network in establishing a light-trail 330 (shown in FIG. 3C). In particular, FIGS. 3A-3C illustrate an example operation of a particular embodiment of an optical network as a particular node 314 attempts to establish a light-trail 330 in response to receiving data traffic from a client device of that node 314. Nodes 314 and fibers 316 and 318 shown in FIGS. 3A-3C may represent a complete optical network or may represent a portion of a larger optical network, such as optical network 10 shown in FIG. 1. Furthermore, although shown as being coupled in a linear manner, nodes 314 may be coupled in a ring, a mesh, or in any other suitable fashion. For example, nodes 314a-f may represent nodes 14a-f of network 10 of FIG. 1. Moreover, nodes 314 may have any suitable design. As an example only, nodes 314 may be implemented using the configuration illustrated in FIG. 2 or any other appropriate configuration. Although FIGS. 3A-3C describe that a light-trail is established by a node in response to receiving traffic, a light-trail may be established for any suitable reason. For example, a network management system may execute one or more algorithms (as described below) that determine where and when to establish a light-trail.

FIG. 3A illustrates an example operation of an optical network as node 314a (referred to below as "convener node 314a") receives data traffic 310 from a client device coupled to convener node 314a. To transmit optical traffic based on the data traffic, convener node 314a determines that a light-trail 330 should be established between convener node 314a and node 314e (referred to below as "end node 314e") along fiber 16. As indicated above, convener node 314a may decide to establish light-trail 330 in response to determining that the amount of optical traffic flowing on other light-trails that couple convener node 314a and end node 314e exceeds a predetermined threshold. Alternatively, any other node or device may initiate the establishment of light-trail 330 for any suitable purpose. Various example techniques for determining how and when light-trails should be assigned between nodes are described below.

Convener node 314a may establish light-trail 330 by sending one or more control messages to end node 314e and/or other nodes 314 on the OSC or other control channel. As used herein, a "message" may represent one or more signal pulses, packets, or frames, or information structured in any other suitable format. For example, in a particular embodiment, convener node 314a transmits a setup message 340 to end node 314e and to all nodes 314b-d between this particular convener node 314a and end node 314e in the direction of traffic. These nodes between the convener node and end node that are to be included in the light-trail may be referred to as "intervening nodes" (it should be noted, however, that not every node between the convener node and end node need be included in a light-trail). Depending on the configuration of the optical network, convener node 314a may transmit setup message 340 on the OSC in the same direction as optical traffic is flowing on fiber 316, in the opposite direction (for example, the OSC on fiber 318), or in both directions (for example, the OSC on both fibers 16 and 18). In the illustrated example, the OSC is assumed to represent a separate wavelength from the wavelengths used to transmit data on fiber 316, and convener node 314a transmits setup message 340 on fiber 316 in the direction traffic is propagating on fiber 316.

Setup message 340 may identify convener node 314a and end node 314e, specify the direction and wavelength to be used for transmissions on light-trail 330, and/or include any other appropriate information to be used by intervening nodes 314b-d and end node 314e to establish light-trail 330. Intervening nodes 314b-d may store setup message 340 until receiving an appropriate indication from end node 314e, such as an acknowledgement message, that end node 314e is prepared to establish light-trail 330.

FIG. 3B illustrates an example operation of the optical network after end node 314e receives setup message 340. End node 314e, in response to receiving setup message 340, may reconfigure a wavelength blocking unit of end node 314e to prevent traffic propagating at the wavelength associated with the requested light-trail 330 from continuing past end node 314e on fiber 316. End node 314e transmits an acknowledgement message 350 to convener node 314a and/or intervening nodes 314b-d once end node 314e has configured the wavelength blocking unit or at any other appropriate time after receiving setup message 340. Acknowledgement message 350 indicates to nodes 314 receiving the acknowledgment message that end node 314e is ready to establish light-trail 330. Convener node 314a and/or intervening nodes 314b-d may configure themselves in any appropriate manner to facilitate establishment of the light-trail, in response to receiving the acknowledgement message 350 or another appropriate form of indication from end node 314e. For example, intervening nodes 314b-d may each reconfigure a wavelength blocking unit of each node 314 to allow the wavelength associated with light-trail 330 to pass through that particular node 314. Additionally, convener node 314a may configure a wavelength blocking unit of convener node 314a to block traffic propagating on fiber 316 at the wavelength, as described above with respect to FIG. 2. By blocking traffic propagating on fiber 316 at the wavelength associated with light-trail 330, convener node 314a may allow other light-trails that do not overlap with light-trail 330 to utilize the same wavelength as light-trail 330 without interfering with traffic transmitted on light-trail 330.

Additionally, each node 314 may maintain a light-trail table or matrix that maintains information regarding light-trails established on optical network 10 or light-trails to which that node 314 is coupled. These light-trail tables may include any appropriate information for the relevant light-trails. For example, light-trail tables may include information specifying the convener node and end node of each light-trail, the wavelength associated with each light-trail, whether each light-trail is currently being used, and/or any other suitable information about each light-trail.

FIG. 3C illustrates a state of optical network 10 after node 314a receives acknowledgement message 350 and performs any appropriate reconfiguration. As a result of the reconfiguration of convener node 314a, intervening nodes 314b-d and end node 314e, light-trail 330 is formed which couples convener node 314a to each intervening node 314b-d and to end node 314e. Once light-trail 330 is established, convener node 314a and/or intervening nodes 314b-d may utilize light-trail 330 for transmissions to downstream intervening nodes 314b-d or to end node 314e.

As mentioned above, the establishment of a light-trail as described in FIGS. 3A-3C is performed in response to a node or other network element determining that a new light-trail needs to be established based on the traffic flow required in the network. In order to establish and assign light-trails in an efficient manner, it is desirable to minimize the resources (wavelengths) used, to minimize the provisioning time (to ensure that the traffic latency incurred in provisioning connections or new light-trails is within the bounds required by the traffic demands), and to maximize the probability that a new bandwidth request from a node will find an available light-trail (thus reducing the probability of needing to create a new light-trail).

A linear program may be developed for optimally assigning light-trails to maximize the wavelength utilization. The entire set of possible light-trails and group flows from source-destination pairs of nodes is considered in this linear program to determine an optimum sub-set of light-trails with the objective being to minimize the number of light-trails that are assigned. Therefore, the light-trail assignment problem is analogous to a "bin packing" problem. The bin packing problem is one in which there are a number bins that are to be filled with different sized objects in each bin so as to maximize the utilization of the bins or to minimize the number of bins used. However, the bin packing problem is known to be NP complete or unsolvable in polynomial time. This means that light-trail assignment problem cannot be solved in polynomial time and that a heuristic solution is needed. The following figures illustrate some example heuristic algorithms according to particular embodiments of the present invention that may be used in this manner. As is described, the proposed algorithms are of two kinds—a first type for use when the traffic matrix (the traffic flow between each source-destination pair of nodes in the network) is known and a quick solution (static) is to be determined, and a second type in which the traffic is not known and an adaptable solution (dynamic) is to be determined. These algorithms may be implemented as software or firmware stored in memory associated with a network management system, a element management system, or with any other component associated with the network.

For use in employing these algorithms, a traffic matrix T is defined to represent the traffic flow between the nodes in a network, such that $T_{ij}$ represents the time-averaged flow from a node i to a node j. The traffic flows may comprise any suitable types of traffic flows. For example, and not by way of limitation, the traffic flows may comprise packet flows, wavelength flows, burst flows, and/or sub-wavelength granular flows. In such a network, for simplicity it is assumed that the line rate, C, of any light-trail is constant throughout the network and that C is normalized into units of flow. Therefore, if $T_{ij}<C$, then the traffic flow from node i to a node j is sub-lambda and might be accommodated in a light-trail. On the other hand, if $T_{ij}>C$ then the flow is greater than the bandwidth offered by a single wavelength. In such a case, the flow $T_{ij}$ may be broken into two different components. A first portion is provisioned into one or more static lightpaths each having C units of flow, while the remainder represents sub-lambda (<C) units of flow that can be provisioned into one or more light-trails.

Figure 4:
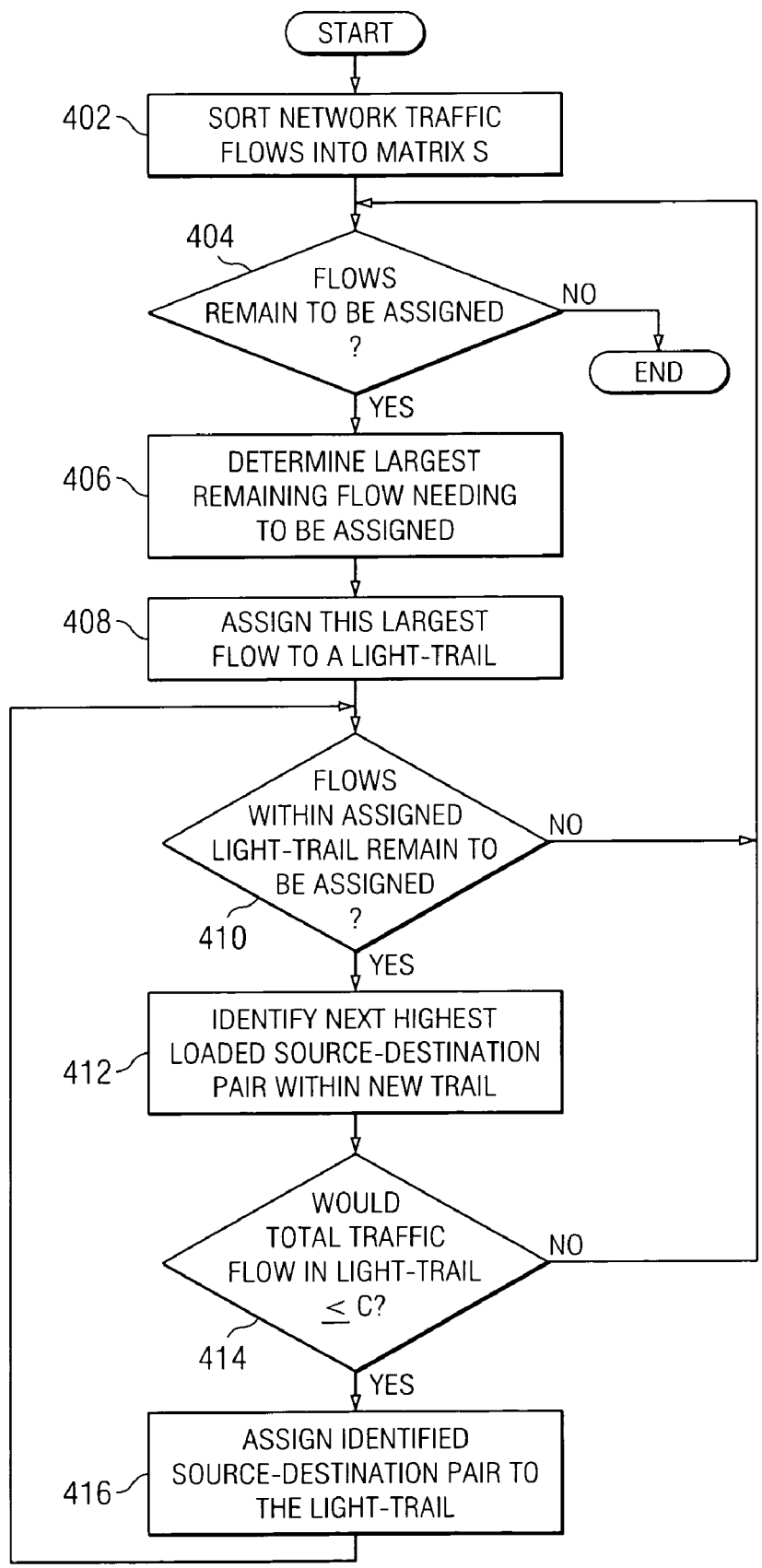
FIG. 4 is a flowchart illustrating an example Heavily Loaded Precedence Scheme or an example Longest Pair Heaviest Load algorithm for assigning light-trails in an optical network.

FIG. 4 is a flowchart illustrating an example Heavily Loaded Precedence Scheme (HLPS) for assigning light-trails in an optical network. This algorithm is for static assignment of light-trails. The method according to the algorithm begins at step 402 where the traffic flow matrix, T, for all source-destination pairs needing light-trail assignment is sorted based on the amount of traffic in each flow. The resulting sorted matrix is denoted matrix S. For this algorithm, L is defined as the set of light-trails that are generated while $f(LT_{ij})$ is the total flow in a light-trail $LT_{ij}$ from a convener node i to end node j. Also defined is v(x,y), which represents the flow from a node x to a node y, and {ab} is the set of nodes in the light-trail corresponding to ring arch a~b. Using these notations, the HLPS algorithm may be represented by the following pseudo-code:

```
While (S) ≠ 0
    Do, SP=max(S)
        LT_ij= SP, L← L+{SP}
        s"d"= {SP}, f(LT_ij)= v(SP)
        S← S − SP
        While f(LT_ij)≦C or s'd'≠ φ
            Find s'd', such that s'd' ∈LT_ij and s'd' ≠ SP and v(s'd' ) > all
v(s'd') ∈ LT_ij
            If v(s'd')+ v(SP) ≦C
                S ←S − v(s'd'),
                LT_ij← LT_ij− s'd'
        End
```

At step 404, the algorithm determines whether there are any flows still to be assigned to a light-trail within S. If not, the method ends. If so, the largest (heaviest) flow needing to be assigned is determined by using the max function at step 406 (this largest remaining flow is denoted as SP above) and a new light-trail $LT_{ij}$ is established assigned to this flow at step 408 (where i identifies the source node for flow SP and j identifies the destination node for that flow). At step 410, it is determined whether there are flows between nodes included in the established light-trail that remain to be assigned to a light-trail. If not, the method returns to step 404 (where a new maximum flow SP is determined—the next largest unassigned flow). If there are unassigned flows within the established light-trail, the method proceeds to step 412, where the next highest loaded source-destination pair (s'd') within this new trail $LT_{ij}$ is determined (the next highest traffic flow within the new light-trail). At step 414, it is determined whether the total traffic flow in the light-trail would be less than or equal to the light-trail capacity C if the flow between the identified source-destination pair were added to the light-trail. If so, the flow between this source-destination pair is assigned to the light-trail at step 416 and the method returns to step 410. If not (if the capacity would be exceeded), the flow is not added to the light-trail and the method returns to step 404 (where a new flow SP is determined—the next largest unassigned flow remaining in matrix S). Therefore, source-destination pairs within a created light-trail are identified and added to the light-trail as described above until the capacity of the light-trail is exhausted or until there are no more source-destination pairs to be found within the light-trail between nodes i and j currently being analyzed. As is noted in the algorithm, as a flow is allocated to a light-trail, that flow is removed from S.

Another algorithm that may be used to assign light-trails is the Longest Pair Heaviest Load (LPHL) algorithm. This algorithm is similar to the HLPS algorithm, except that the sorting technique used to create matrix S gives priority to the heaviest flows and to flows which also include the most hops between nodes. The idea is to incorporate the maximum number of diverse flows by considering longer light-trails first. The algorithm may be represented by pseudo-code as follows:

```
Create {S}, such that S_ij=max(T) and so on (sorting),
and |i−j|>|i'−j'| for S_i'j'=S_ij
    While (S) ≠ 0
        Do, SP=max(S)
            LT_ij= SP, L← L+{SP}
            s"d"= {SP}, f(LT_ij) = v(SP)
            S← S − SP
        While f(LT_ij)≦C or s'd'≠ φ
            Find s'd', such that s'd'∈LT_ij and s'd'≠ SP and v(s'd') > all v(s'd') ∈
LT_ij
            If v(s'd') + v(SP) ≦ C
                S ← S − v(s'd'), LT_ij ← LT_ij − s'd'
        End
```

The algorithm is similar to the HLPS algorithm except in the first step 402, where a sorted traffic matrix S is created based on two factors—heaviest flow and longest path in that order of precedence (instead of just based on the heaviest flow as in the HLPS algorithm). Subsequently, the maximum flow from matrix S is selected and a light-trail is created to accommodate this flow. All flows that have sources and destinations within the newly created light-trail are then mapped into the light-trail under the constraint that the total flow of the light-trail is lesser than the maximum wavelength bandwidth C, as described above and as illustrated in FIG. 4. The LPHL algorithm generally performs slightly better than HLPS, but also has generally has a longer execution time.

Figure 5:
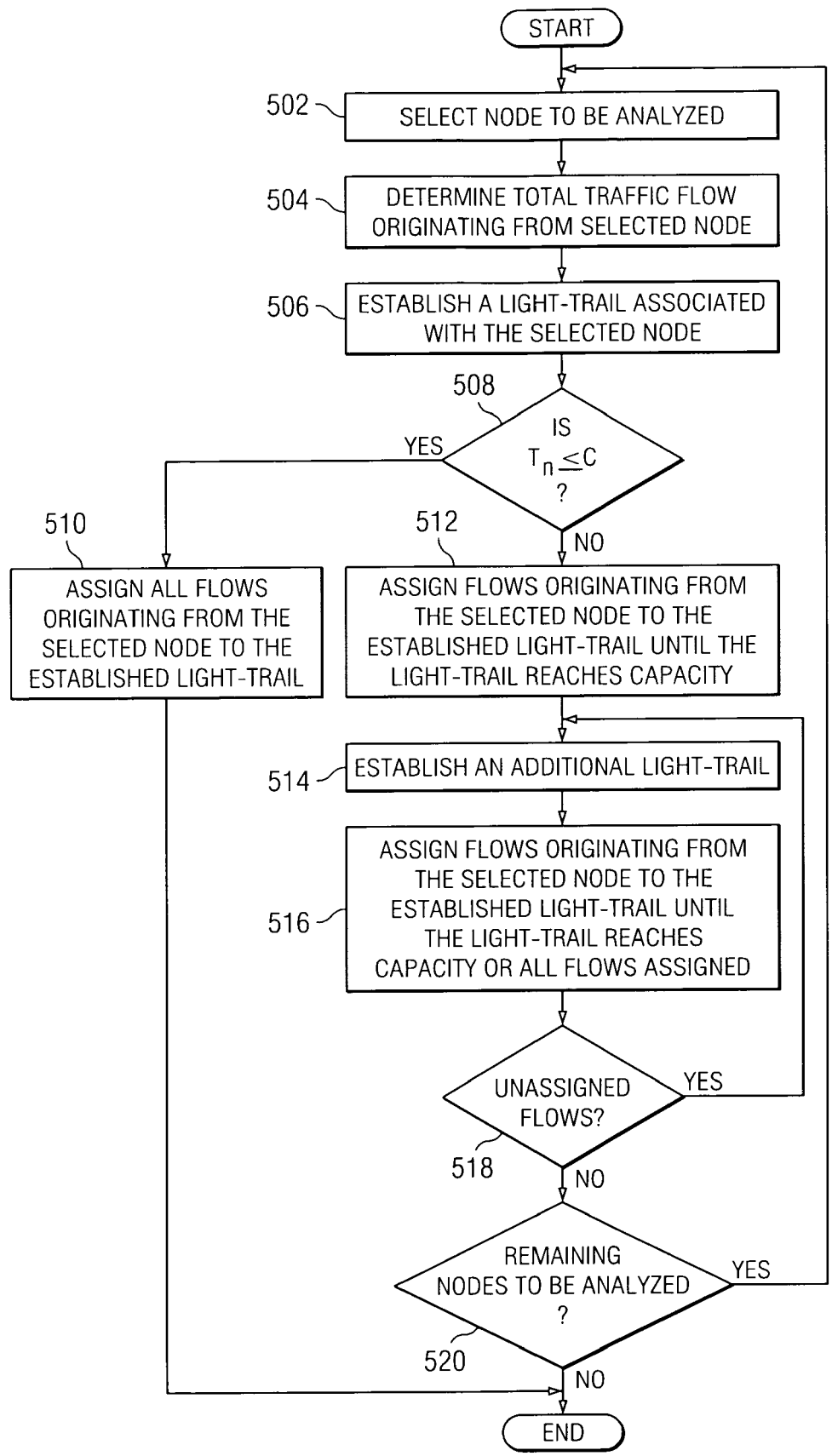
FIG. 5 is a flowchart illustrating an example Per Node Precedence Assignment algorithm for assigning light-trails in an optical network.

FIG. 5 is a flowchart illustrating an example Per Node Precedence Assignment (PNPS) algorithm for assigning light-trails in an optical network. This algorithm is for static assignment of light-trails. In the PNPS algorithm, a light-trail is initially created for every node that begins from the node (so the minimum number of light-trails that can be created is equal to the total number of nodes in the network). The flows originating from each node (destined for each of the other nodes in the ring) are then mapped. If the total nodal flow for an originating node (the sum of all the flows originating from a node destined for all other nodes) cannot be met by a single light-trail, then one or more additional light-trails are formed until all the flows originating from a node are assigned to a light-trail. This process is performed for each node in the network that originates traffic until all flows in the network have been assigned to a light-trail (or are otherwise routed successfully).

The PNPS algorithm may be represented by pseudo-code as follows:

```
For each n ∈ N
    Calculate T_n from T, such that:

T_n = ∑_{j=1}^{N} f (n, j), j ≠ n

Do create K_n light-trails of N-1 hops (spans) originating at n,
        If T_n ≤ C; K_n = 1

Elseif T_n > C; K_n = ⌈T_n/C⌉ + 1 (⌈ ⌉ indicating neglecting the
    remainder)
End
```

As can be seen from the above pseudo-code, the algorithm is repeated for each node n that is part of an N-node ring. The method according to the algorithm thus starts at step 502 where a node n is selected to be analyzed. At step 504, the total traffic flow ($T_n$) originating from node n is determined. Next, $K_n$ light-trails are established from n where $K_n$ depends on the value of $T_n$. The larger the value of $T_n$, the higher the number of light-trails required. More specifically, at step 506, a light-trail is established that is associated with the selected node. At step 508, it is determined whether $T_n \leq C$. If so, all of the flows originating from the node n are assigned to the established light-trail at step 510 and the method ends. If not, the flows originating from node n are assigned to the established light-trail at step 512 until the light-trail reaches capacity (i.e., until the total flow of the added flows equals C or until there is not enough remaining capacity to add the next flow). Flows originating from node n can be successively assigned to the light-trail in any suitable order (for example, starting with flows ending closest to node n and working outward, starting with flows ending farthest from node n and working inward, based on the amount of traffic included in the traffic flow, or in any other order). At step 514, an additional light-trail is established (since reaching this step means that all the flows originating from node n cannot be assigned to a single light-trail). At step 516, the remaining flows originating from node n are successively assigned to the light-trail in any suitable order until the additional light-trail reaches capacity or until all the flows originating from node n have been assigned. At step 518, it is determined whether any flows originating from node n still need to be assigned. If so, the method returns to step 514 where yet another light-trail is established. If not, the method proceeds to step 520, where it is determined whether any remaining nodes in the network remain to be analyzed. If so, the method returns to step 502. If not, the method ends.

Figure 6A:
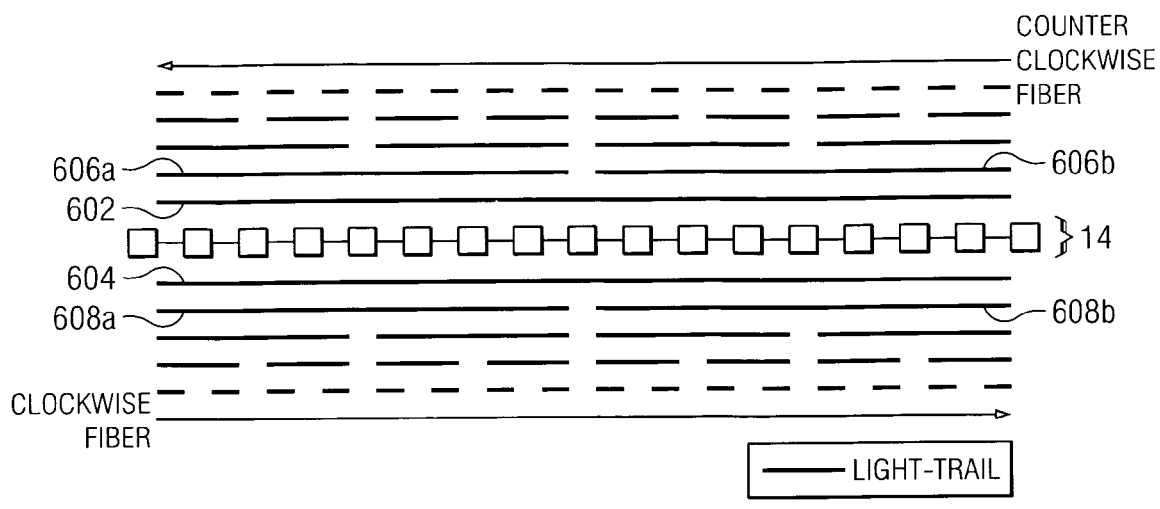
FIGS. 6A and 6B illustrate an example Cantor Set Growth Method for assigning light-trails in an optical network.
Figure 6B:
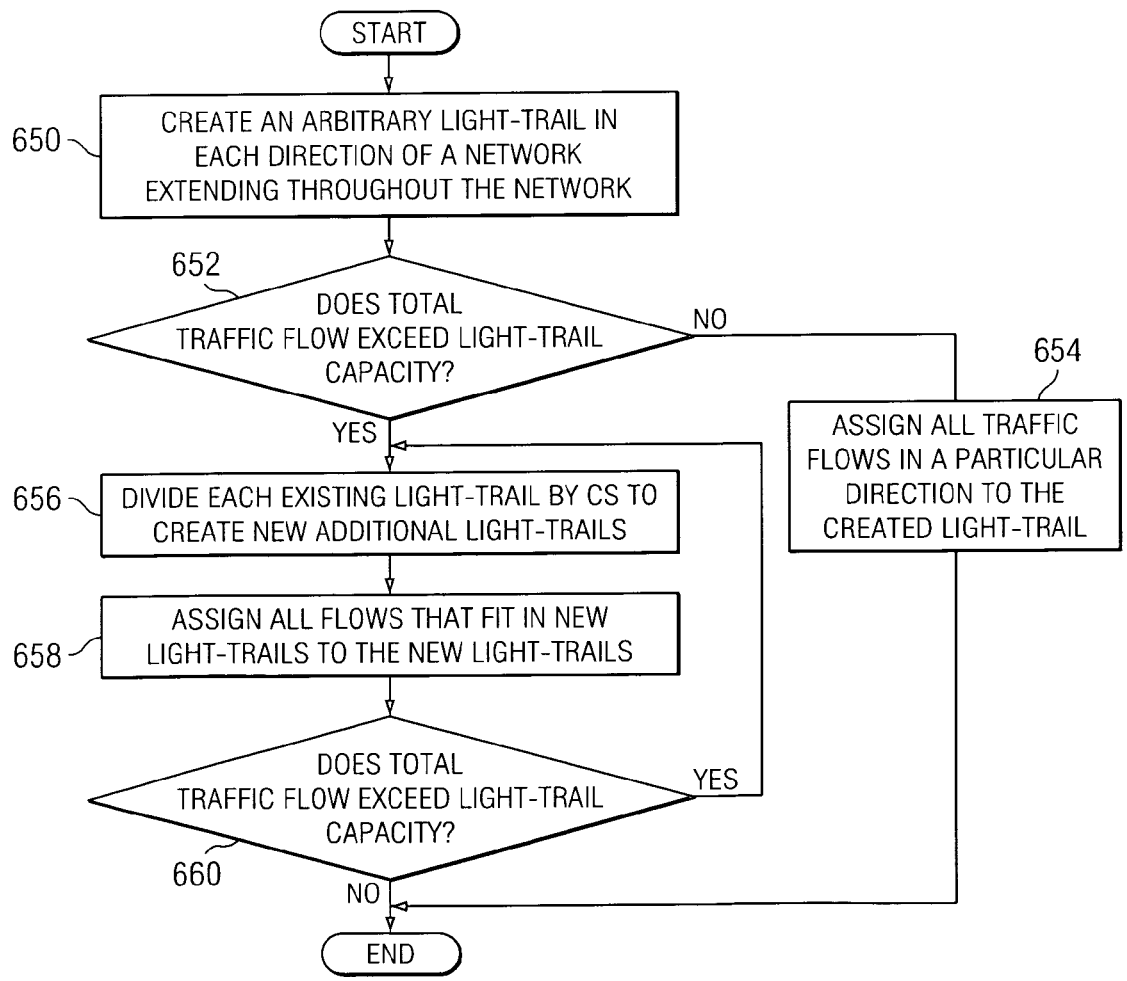

FIGS. 6A and 6B illustrate an example Cantor Set Growth Method (CSGM) for assigning light-trails in an optical network. This algorithm is for dynamic assignment of light-trails when the traffic matrix T cannot be determined before light-trails are assigned. In the CSGM for a ring network of N nodes in a ring network with two counter-propagating fibers (it may also be applied to other types of networks), two arbitrary light-trails 602 and 604 (illustrated in FIG. 6A) are created at step 650 (illustrated in FIG. 6B). These light-trails are created such that the convener node of light-trail 602 is the end node of light-trail 604 and vice versa, with the constraint that light-trails 602 and 604 have N-1 hops. Thus, two light-trails are created in opposite directions in the network able to cover (at least spatially) all the traffic flows in the network.

At step 652, it is determined whether the total traffic flow in each direction exceeds the capacity of the associated light-trail 602 or 604. If not, all the traffic flows are assigned to the light-trails at step 654 and the method ends. The method may be re-started beginning at step 656 if the total traffic flow increases and exceeds the total capacity available. If the total traffic flow is determined to exceed capacity at step 652, then the method proceeds to step 656 where each light-trail 602 and 604 is divided by a cantor set dividing value (CS) to create additional light-trails. In the example illustrated in FIG. 6A, the CS value is equal to two and thus two new light-trails 606a and 606b are created by dividing light-trail 602 and two new light-trails 608a and 608b are created by dividing light-trail 604. Thus, these new light-trails combined together include the same path as the previously-established light-trails 602 and 604. Light-trails 602 and 604 remain such that there are three light-trails in each direction in the network. Although a CS value of two is used, any other suitable value of CS may alternatively be used.

At step 658, all traffic flows that "fit" within the new light-trails 606 and 608 may be assigned to these light-trails. A traffic flow fits within a light-trail if the path from its convener node to its end node is entirely included in the light-trail. The light-trails that do not fit within the newly-created light-trails keep their assignment to the previously-created light-trail(s) to which they were last assigned (in this iteration, either light-trail 602 or 604). Alternatively, the flows may be assigned between the light-trails based on a "best fit" heuristic technique as is commonly used in "bin packing" problems or using one of the static assignments algorithms described above for each created light-trail. At step 660, it is determined whether the total traffic flow in the newly-created light-trails exceeds the capacity of any of those light-trails (it should be noted that if, at this point, the capacity of a previously-created light-trail(s) is still exceeded, then an entirely new light-trail like light-trails 602 and 604 may need to be created and the CSGM performed for that light-trail). If the capacity is not exceeded, then the method ends. As mentioned above, the method may be re-started beginning at step 656 if the total traffic flow increases and exceeds the total capacity. If the total traffic flow is determined to exceed capacity at step 660, then the method returns to step 656 where each light-trail 606a, 606b, 608a, and 608b is divided by the CS value to create additional light-trails. FIG. 6A illustrates this dividing process occurring a total of four times; however, it may be performed as many times as is required to successfully route all traffic flows.

Figure 7A:
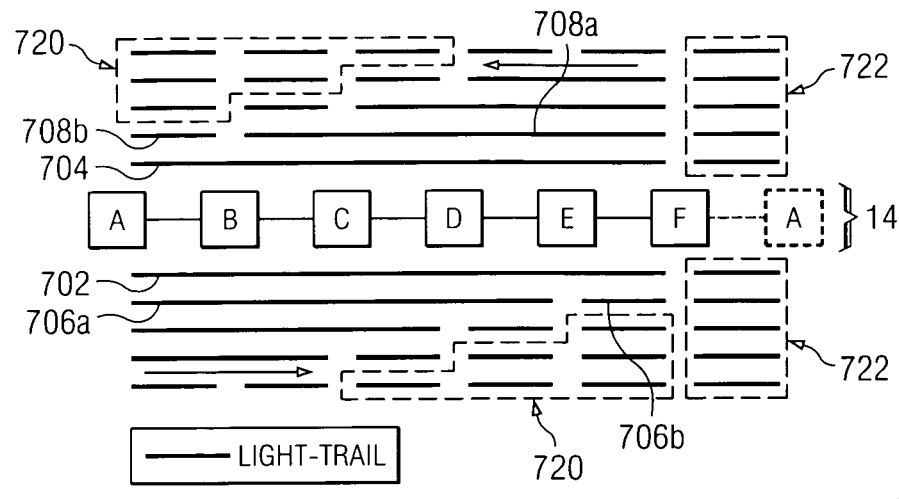
FIGS. 7A and 7B illustrate an example Decrement Wrapping Technique for assigning light-trails in an optical network.
Figure 7B:
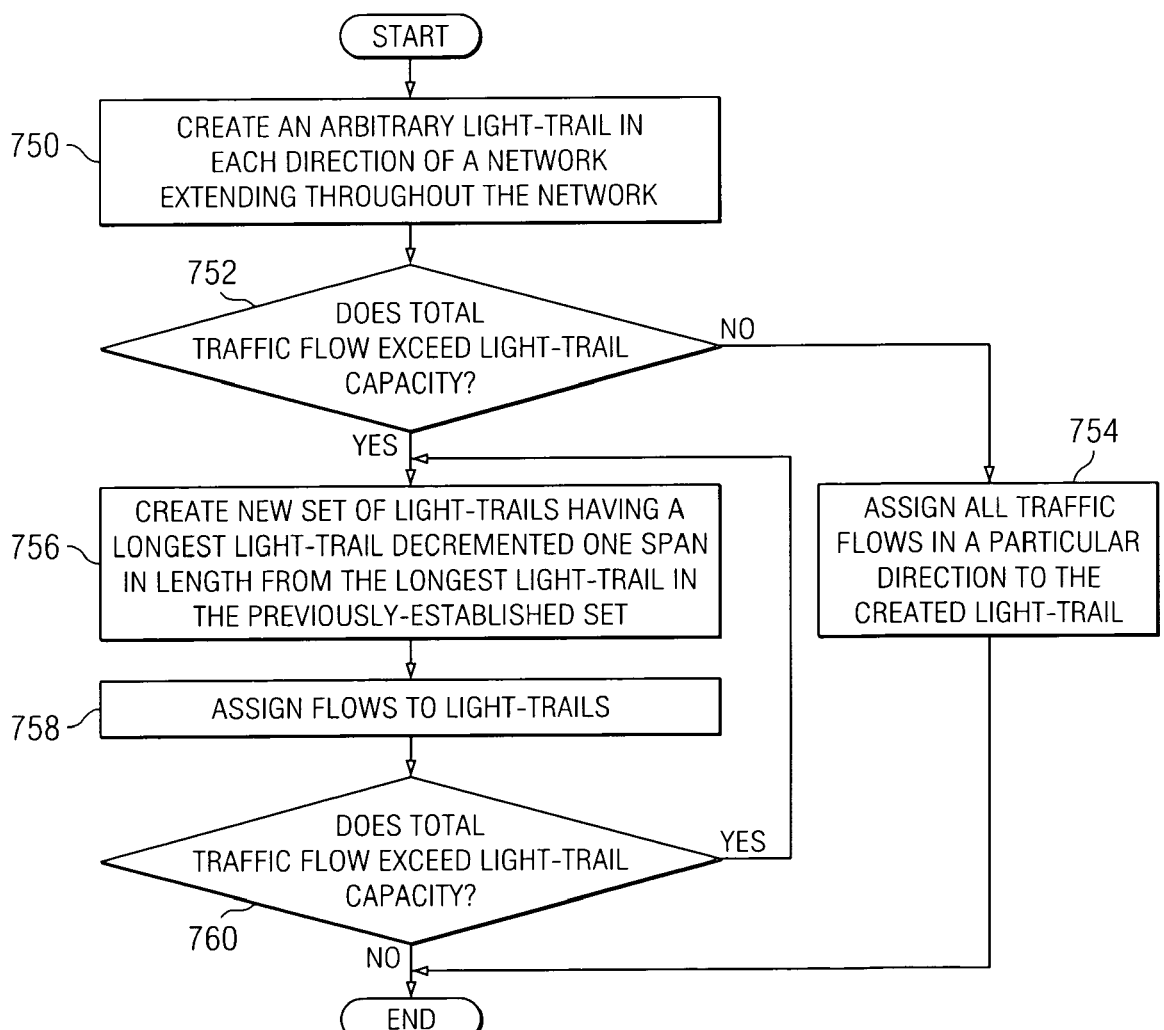

FIGS. 7A and 7B illustrate an example Decrement Wrapping Technique for assigning light-trails in an optical network. In this technique, at step 750 of FIG. 7B, a clockwise light-trail 702 (illustrated in FIG. 7A) is established in a bi-directional two-fiber ring network of N nodes 14. This light-trail 702 begins at an arbitrary node 14 in the ring—node "A" ($N_A$) in the example illustrated in FIG. 7A—and continues N-1 hops (spans) around the ring. The convener node for light-trail 702 is thus $N_A$ and the end node is $N_{A+N-1}=N_F$ (in an example network including six nodes). A light-trail 704 is also established at step 750 in the counterclockwise fiber beginning at $N_F$ and ending at $N_A$. Therefore, these two light-trails 702 and 704 can provide complete connectivity if the total capacity required by all the traffic flows in a particular direction is less than the capacity of each light-trail (wavelength). However, if the total load is higher than the capacity, then these two light-trails are not sufficient and additional light-trails need to be created.

Therefore, at step 752, it is determined whether the total traffic flow in each direction exceeds the capacity of the associated light-trail 702 or 704. If not, all the traffic flows are assigned to the light-trail at step 754 and the method ends. The method may be re-started beginning at step 756 if the total traffic flow ever increases and exceeds the total capacity available. If the total traffic flow is determined to exceed the capacity at step 752, then the method proceeds to step 756 where a new set of light-trails 706a and 706b are created by splitting light-trail 702 and two new light-trails 708a and 708b are created by splitting light-trail 704. The previously-created light-trails 702 and 704 remain. Unlike the CSGM where the previously-created light-trails are divided evenly into cantor sets, in the Decrement Wrapping Technique the new light-trails include a first light-trail (706a and 708a in this iteration) that has a length one span shorter than the longest light-trail in the previously-created set of light-trails (light-trails 702 and 704) and at least a second light-trail (706b and 708b in this iteration) that include the single hop that was decremented to create the associated first light trail (706a and 708a). Thus, these new light-trails combined together include the same path as the previously-established light-trails 702 and 704.

As indicated in FIG. 7A, in some embodiments "duplicative" light-trails 720 (light-trails that are identical to a previously-created light-trail) may also be created along with the other light-trails in each successive set of light-trails (however, this is optional). Furthermore, although light-trails 702 and 704 are sufficient (at least spatially) to cover all traffic flows, in some embodiments light-trails 722 may also be created along with the other light-trails in each successive set.

At step 758, the traffic flows are assigned to the existing light-trails. The logic is generally to route shorter flows in the shorter light-trails and longer flows in the longer light-trail while still creating a large set of very small light-trails to suffice very short duration traffic. The flows may be assigned between the light-trails based on a "best fit" heuristic technique as is commonly used in "bin packing" problems, using one of the static assignments algorithms described above for each created light-trail, or using any other suitable technique. At step 760, it is determined whether the total traffic flow exceeds the capacity of the existing light-trails. If the capacity is not exceeded, then the method ends. As mentioned above, the method may be re-started beginning at step 756 if the total traffic flow increases and exceeds the total capacity. If the total traffic flow is determined to exceed capacity at step 760, then the method returns to step 756 where light-trails 706a and 708a are decremented as described above. FIG. 7A illustrates this decrementing process occurring a total of four times; however, it may be performed as many times as is required to successful route all traffic flows.

It should be understood that some of the steps illustrated in the preceding flowchart may be combined, modified or deleted where appropriate, and additional steps may also be added to the flowchart. Additionally, the steps may be performed in any suitable order. Furthermore, although the present invention has been described with several embodiments, various changes and modifications may be suggested to one skilled in the art. It is intended that the present invention encompass such changes and modifications as fall within the scope of the appended claims.

What is claimed is:

1. A method for assigning light-trails in an optical network, the optical network operable to carry traffic flows in a plurality of light-trails between a plurality of nodes, the method comprising the steps of:

identifying unassigned traffic flows in the optical network that require assignment to a light-trail, each traffic flow being communicated from an associated source node to an associated destination node;

identifying which unassigned traffic flow includes the largest amount of traffic;

establishing a new light-trail beginning at the source node of the identified traffic flow and ending at the destination node of the identified traffic flow and assigning the identified traffic flow to the established light-trail;

determining whether there are any unassigned traffic flows having associated source and destination nodes included in the established light-trail;

if such unassigned traffic flows are determined to exist within the light-trail, assigning the unassigned traffic flows to the light-trail in order of the amount of traffic each traffic flow includes until a capacity of the light-trail is reached; and repeating the steps of the method until no traffic flows in the optical network require assignment to a light-trail.

2. The method of claim 1, further comprising determining which of the traffic flows identified as having the largest amount of traffic also includes the longest path length and assigning this determined traffic flow to the established light-trail.

3. A computer-readable medium encoded with computer-executable instructions for assigning light-trails in an optical network, the optical network operable to carry traffic flows in a plurality of light-trails between a plurality of nodes, the instructions operable when executed by a computer to perform the steps of:

identifying unassigned traffic flows in the optical network that require assignment to a light-trail, each traffic flow being communicated from an associated source node to an associated destination node;

identifying which unassigned traffic flow includes the largest amount of traffic;

establishing a new light-trail beginning at the source node of the identified traffic flow and ending at the destination node of the identified traffic flow and assigning the identified traffic flow to the established light-trail;

determining whether there are any unassigned traffic flows having associated source and destination nodes included in the established light-trail;

if such unassigned traffic flows are determined to exist within the light-trail, assigning the unassigned traffic flows to the light-trail in order of the amount of traffic each traffic flow includes until a capacity of the light-trail is reached; and repeating the steps recited above until no traffic flows in the optical network require assignment to a light-trail.

4. The computer-readable medium of claim 3, wherein the instructions are further operable to determine which of the traffic flows identified as having the largest amount of traffic also includes the longest path length and assign this determined traffic flow to the established light-trail.

5. A method for assigning light-trails in an optical network, the optical network operable to carry traffic flows in a plurality of light-trails between a plurality of nodes, the method comprising the steps of:

selecting a node in the optical network for which traffic flows originating from the node have not been assigned to a light-trail;

identifying the traffic flows originating from the selected node, each traffic flow being communicated from the selected node to an associated destination node;

establishing a new light-trail beginning at the selected node and including all destination nodes associated with the identified traffic flows originating from the selected node;

assigning the identified traffic flows to the established light-trail until a capacity of the light-trail is reached;

if identified traffic flows remain unassigned, establishing another light-trail, assigning the identified traffic flows to this light-trail until a capacity of the light-trail is reached, and repeating this step until all identified traffic flows originating from the selected node are assigned to a light-trail; and repeating the steps of the method for each of the plurality of nodes.

6. The method of claim 5, wherein the identified traffic flows associated with a selected node are assigned to one or more light-trails established for the selected node based on the path length of the traffic flow.

7. The method of claim 5, wherein the identified traffic flows associated with a selected node are assigned to one or more light-trails established for the selected node based on the amount of traffic included in the traffic flow.

8. A computer-readable medium encoded with computer-executable instructions for assigning light-trails in an optical network, the optical network operable to carry traffic flows in a plurality of light-trails between a plurality of nodes, the and instructions operable when executed by a computer to perform the steps of:

selecting a node in the optical network for which traffic flows originating from the node have not been assigned to a light-trail;

identifying the traffic flows originating from the selected node, each traffic flow being communicated from the selected node to an associated destination node; establish establishing a new light-trail beginning at the selected node and including all destination nodes associated with the identified traffic flows originating from the selected node;

assigning the identified traffic flows to the established light-trail until a capacity of the light-trail is reached;

if identified traffic flows remain unassigned, establish another light-trail, assigning the identified traffic flows to this light-trail until a capacity of the light-trail is reached, and repeating this step until all identified traffic flows originating from the selected node are assigned to a light-trail; and repeating the steps recited above for each of the plurality of nodes.

9. The computer-readable medium of claim 8, wherein the identified traffic flows associated with a selected node are assigned to one or more light-trails established for the selected node based on the path length of the traffic flow.

10. The software computer-readable medium of claim 8, wherein the identified traffic flows associated with a selected node are assigned to one or more light-trails established for the selected node based on the amount of traffic included in the traffic flow.

11. A method for assigning light-trails in an optical network, the optical network operable to carry traffic flows in a plurality of light-trails
between a plurality of nodes, the method comprising the steps of: establishing a light-trail beginning at a first node in the optical network and ending at a second node such that the path of the light-trail includes all traffic flows that that require assignment to a light-trail;

if the total traffic flow of all the traffic flows does not exceed the capacity of the established light-trail, assigning all the traffic flows to the established light-trail;

if the total traffic flow of all the traffic flows exceeds the capacity of the established light-trail, creating two or more additional light-trails that together include the same path as the previously-established light-trail; and repeating the previous step of the method for each of the additional light-trails until there are sufficient number of light-trails such that all the traffic flows are assigned to a light-trail.

12. The method of claim 11, wherein creating two or more additional light-trails that together include the same path as the previously-established light-trail comprises creating two or more additional light-trails that are equal to one another in length.

13. The method of claim 11, wherein creating two or more additional light-trails that together include the same path as the previously-established light-trail comprises creating a first light-trail that is decremented in length from the previously-established light-trail by the path length between two adjacent nodes at one end the previously-established light-trail and creating a second light-trail that comprises the decremented path length.

14. A computer-readable medium encoded with computer-executable instructions for assigning light-trails in an optical network, the optical network operable to carry traffic flows in a plurality of light-trails between a plurality of nodes, the instructions operable when executed by a computer to perform the steps of:

establishing a light-trail beginning at a first node in the optical network and ending at a second node such that the path of the light-trail includes all traffic flows that that require assignment to a light-trail;

if the total traffic flow of all the traffic flows does not exceed the capacity of the established light-trail, assigning all the traffic flows to the established light-trail;

if the total traffic flow of all the traffic flows exceeds the capacity of the established light-trail, creating two or more additional light-trails that together include the same path as the previously-established light-trail;

repeating the previous step for each of the additional light-trails until there are sufficient number of light-trails such that all the traffic flows are assigned to a light-trail.

15. The computer-readable medium of claim 14, wherein creating two or more additional light-trails that together include the same path as the previously-established light-trail comprises creating two or more additional light-trails that are equal to one another in length.

16. The computer-readable medium of claim 14, wherein creating two or more additional light-trails that together include the same path as the previously-established light-trail comprises creating a first light-trail that is decremented in length from the previously-established light-trail by the path length between two adjacent nodes at one end the previously-established light-trail and creating a second light-trail that comprises the decremented path length.

* * * * *